US008817631B2

(12) United States Patent
Xu et al.

(10) Patent No.: US 8,817,631 B2
(45) Date of Patent: Aug. 26, 2014

(54) CONTENTION-BASED UPLINK DATA TRANSMISSION METHOD, APPARATUS AND SYSTEM

(75) Inventors: Haibo Xu, Beijing (CN); Yuantao Zhang, Beijing (CN); Hua Zhou, Beijing (CN); Jianming Wu, Beijing (CN); Yoshiaki Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 13/567,559

(22) Filed: Aug. 6, 2012

(65) Prior Publication Data

US 2013/0195079 A1 Aug. 1, 2013

Related U.S. Application Data

(63) Continuation of application No. PCT/CN2010/070668, filed on Feb. 11, 2010.

(51) Int. Cl.
*G01R 31/08* (2006.01)

(52) U.S. Cl.
USPC ............................ 370/237; 370/329; 370/400

(58) Field of Classification Search
CPC ............ H04W 74/08; H04W 74/0833; H04W 72/042; H04W 28/04; H04W 74/006
See application file for complete search history.

(56) References Cited

U.S. PATENT DOCUMENTS

| 2010/0296467 | A1* | 11/2010 | Pelletier et al. | 370/329 |
| 2011/0292895 | A1* | 12/2011 | Wager et al. | 370/329 |
| 2012/0147830 | A1* | 6/2012 | Lohr et al. | 370/329 |
| 2012/0201219 | A1* | 8/2012 | Wager et al. | 370/329 |
| 2012/0287877 | A1* | 11/2012 | Han et al. | 370/329 |
| 2013/0010712 | A1* | 1/2013 | Kim et al. | 370/329 |

FOREIGN PATENT DOCUMENTS

| CN | 1685743 | 10/2005 |
| CN | 101426271 | 5/2009 |
| TW | 200948161 | 11/2009 |
| WO | 2009/135435 | 11/2009 |

OTHER PUBLICATIONS

Ericsson, ST-Ericsson; 3GPP TSG-RAN WG2 #68bis, Valencia, Spain, Jan. 18-22, 2010; R2-100125; "Impacts of contention based uplink in RAN2"; Document for: Discussion and decision; Agenda Item: 7.2; Jan. 2010.

* cited by examiner

*Primary Examiner* — Jung Park
(74) *Attorney, Agent, or Firm* — Myers Wolin, LLC

(57) ABSTRACT

A contention-based uplink data transmission method, apparatus and system are provided. The method may include that: a main control node in a communication system receives data transmitted via uplink contention transmission resources, and decodes the data, wherein the uplink contention transmission resources are uplink transmission resources which the main control node allocates to a plurality of terminal nodes in the communication system and via which the plurality of terminal nodes transmits data in a contention-based way; and the main control node sends reception status information to each terminal node transmitting the data via the uplink contention transmission resources, wherein the reception status information reflects whether the data transmitted from each terminal node has been decoded successfully.

10 Claims, 13 Drawing Sheets

CONTENTION-BASED UPLINK DATA TRANSMISSION METHOD, APPARATUS AND SYSTEM

CROSS-REFERENCE TO RELATED APPLICATIONS

The present application is a continuation of PCT Application No. PCT/CN2010/070668, filed on Feb. 11, 2010, the contents of which are herein wholly incorporated by reference.

FIELD

The disclosure relates to the field of communications, and particularly, to contention-based uplink transmission method, contention-based uplink transmission apparatus and a communication system including the same.

BACKGROUND

With respect to the fourth generation mobile communication system, i.e. the International Mobile Telecommunications—Advanced (IMT-Advanced), ITU-R proposed some requirements on supportable bandwidth, data transmission rate, time delay, mobility and coverage of the system. The requirements on time delay include requirements on control plane delays and requirements on user plane delays. As shown in FIG. 1, the control plane delays include: delay resulted from the transition between idle mode and connected mode and delay resulted from the transition between active state and dormant state under the connected mode; where the delay resulted from the transition between idle mode and connected mode is required to be no more than 50 ms, and the delay resulted from the transition between active state and dormant state is required to be no more than 10 ms.

How to meet the above requirements on time delay is a hot point of the art. Currently used schemes include: decreasing the transmission period of schedule request and introducing contention based uplink data transmission, etc.

3GPP R2-100125, i.e. "Impacts of Contention Based Uplink in RAN2" (Ericsson, 3GPP RAN2 #68bis, Valencia, Spain, Jan. 18 to 22, 2010) discloses a contention based uplink data transmission method in which the base station notifies the user equipment of contention based radio network temporary identifier (CB-RNTI) available in the contention based uplink transmission via a broadcast signaling or a dedicated signaling. When receiving the CB-RNTI, the user equipment starts to listen to the physical downlink control channel (PDCCH), and decodes the uplink resource for contention transmission (CB-grant). The base station determines whether to allocate uplink resources within each sub-frame based on a currently used scheduling algorithm. When the user equipment obtains the CB-grant by decoding on the PDCCH, it starts to process the data for uplink transmission. At the timing corresponding to the CB-grant, the user equipment transmits the data on the physical uplink shared channel. By using the contention-based uplink transmission method, the user equipment needs not to transmit a scheduling request to the base station to request the base station to allocate uplink resources for it. In this way, the time delay of the user equipment resulted from transition between the active state and the dormant state can be reduced in a degree.

SUMMARY

Some embodiments of the disclosure provide a contention-based uplink transmission method, apparatus, and system in which the main control node of the communication system can feeds back the information of receipt status of the uplink transmitted data to a terminal node which transmits the data in time, so that the terminal node can get aware in time whether the data it transmitted has been successfully received or not.

According to an aspect of the disclosure, a method for contention-based uplink transmission in a communication system is provided, which includes: receiving, by a main control node in the communication system, data transmitted via a uplink contention transmission resource, and decoding the received data, wherein the uplink contention transmission resource is a uplink transmission resource which is allocated by the main control node to a plurality of terminal nodes in the communication system and used for uplink transmission by the plurality of terminal nodes in a contention-based manner; and returning, by the main control node to terminal nodes transmitting data via the uplink contention transmission resource, receipt status information which reflects whether the data transmitted by the terminal nodes has been successfully decoded.

According to another aspect of the disclosure, a method for contention-based uplink transmission in a communication system is provided, which includes: receiving, by a fourth terminal node in the communication system after transmitting data via a uplink contention transmission resource to a main control node in the communication system, receipt status information which is returned from the main control node and reflects whether data transmitted by terminal nodes, transmitting data in a contention-based manner to the main control node via the uplink contention transmission resource, has been successfully decoded, wherein the uplink contention transmission resource is a uplink transmission resource which is allocated by the main control node to a plurality of terminal nodes in the communication system and used for uplink transmission by the plurality of terminal nodes in a contention-based manner; and determining whether the data transmitted by the fourth terminal node has been successfully decoded according to the receipt status information.

According to another aspect of the disclosure, an apparatus for contention-based uplink transmission is provided, which is configured in a main control node in a communication system and includes: a receiving device, configured to receive data transmitted via a uplink contention transmission resource, wherein the uplink contention transmission resource is a uplink transmission resource which is allocated by the main control node to a plurality of terminal nodes in the communication system and used for uplink transmission by the plurality of terminal nodes in a contention-based manner; a decoding device, configured to decode the received data; and a status returning device, configured to return to terminal nodes transmitting data via the uplink contention transmission resource, receipt status information which reflects whether the data transmitted by the terminal nodes has been successfully decoded.

According to another aspect of the disclosure, a terminal node in a communication system is provided. The terminal node includes a status receiving device, configured to receive, after the current terminal node transmits data via a uplink contention transmission resource to a main control node in the communication system, receipt status information which is returned from the main control node and reflects whether data transmitted by terminal nodes, transmitting data in a contention-based manner to the main control node via the uplink contention transmission resource, has been successfully decoded, wherein the uplink contention transmission resource is a uplink transmission resource which is allocated by the main control node to a plurality of terminal nodes in the communication system and used for uplink transmission by the plurality of terminal nodes in a contention-based manner; and a status determining device, configured to determine whether the data transmitted by the current terminal node has been successfully decoded according to the receipt status information.

According to another aspect of the disclosure, a method for contention-based uplink transmission in a communication system is provided. The method includes: receiving, by a main control node in the communication system, data transmitted via a uplink contention transmission resource, and decoding the received data, wherein the uplink contention transmission resource is a uplink transmission resource which is allocated by the main control node to a plurality of terminal nodes in the communication system and used for uplink transmission by the plurality of terminal nodes in a contention-based manner; and returning, by the main control node to terminal nodes transmitting data via the uplink contention transmission resource, receipt status information which reflects whether the data transmitted by the terminal nodes has been successfully decoded. The method further includes, receiving, by a fourth terminal node in the communication system after transmitting data via a uplink contention transmission resource to a main control node in the communication system, receipt status information; and determining whether the data transmitted by the fourth terminal node has been successfully decoded according to the receipt status information.

According to another aspect of the disclosure, there is provided a communication system. The communication system includes a main control node (e.g. the base station) and a terminal node. The main control node includes a contention based uplink data transmission apparatus including: a receiving device, configured to receive data transmitted via a uplink contention transmission resource, wherein the uplink contention transmission resource is a uplink transmission resource which is allocated by the main control node to a plurality of terminal nodes in the communication system and used for uplink transmission by the plurality of terminal nodes in a contention-based manner; a decoding device, configured to decode the received data; and a status returning device, configured to return to terminal nodes transmitting data via the uplink contention transmission resource, receipt status information which reflects whether the data transmitted by the terminal nodes has been successfully decoded. The terminal node includes: a status receiving device, configured to receive, after the current terminal node transmits data via a uplink contention transmission resource to a main control node in the communication system, receipt status information which is returned from the main control node and reflects whether data transmitted by terminal nodes, transmitting data in a contention-based manner to the main control node via the uplink contention transmission resource, has been successfully decoded, wherein the uplink contention transmission resource is a uplink transmission resource which is allocated by the main control node to a plurality of terminal nodes in the communication system and used for uplink transmission by the plurality of terminal nodes in a contention-based manner; and a status determining device, configured to determine whether the data transmitted by the current terminal node has been successfully decoded according to the receipt status information.

In addition, an embodiment of the invention provides computer program for realizing the above method.

Furthermore, an embodiment of the disclosure provides a computer program product in the form of computer readable medium on which there are recorded computer program codes for the above method.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Figure 1:
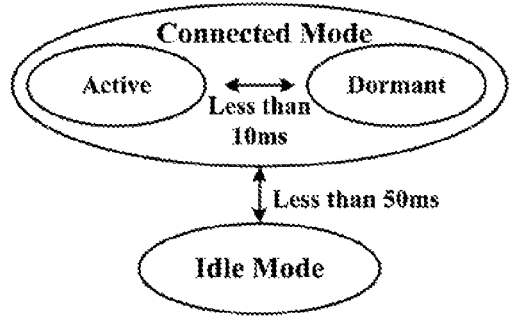
FIG. 1 is a schematic diagram showing the requirements of ITU-R on the time delays resulted from the transition between different states on the control plane.

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

3GPP R2-100125 provides a contention based method of transmitting data from a user equipment to a base station. However, it fails to provide a method of feeding back the information on data receipt status from the base station to the user equipment, i.e. it does not provide on how to make a user equipment to know whether the data transmitted from the user equipment has been correctly received or not. In contention based uplink transmission, there may occur an uplink transmission collision resulted from a plurality of users transmitting data on the same uplink resource. In the existing communication system (e.g. LTE system), if a base station successfully decodes the data from a user equipment, it generally feeds back an ACK indicating the correct receipt of the data to the user terminal via a physical layer feedback signaling (i.e. via physical hybrid ARQ (automatic repeat request) indicator channel, PHICH); otherwise, it feeds back an NACK indicating incorrect receipt of the data. Since the existing PHICH can transmit only one bit at a time, the existing feedback mechanism using the physical layer feedback signaling is not suitable to the contention based uplink transmission. For example, it is supposed that a user equipment A and a user equipment B transmit data on the same uplink resource. In the case that only the data from the user equipment A is successfully decoded by the base station, if the base station transmits an ACK via the existing PHICH, the ACK massage will reach both of the user equipment A and the user equipment B and thus the user equipment B will mistakenly consider that the data transmitted by it has been correctly receipt.

Some embodiments of the disclosure provide a contention-based uplink transmission method, apparatus and system, in which the main control node of the communication system can feeds back the information of receipt status of the uplink transmitted data to a terminal node which transmits the data in time, so that the terminal node can get aware in time whether the data it transmitted has been successfully received or not. The so called main control node may be a base station (e.g.

eNodeB) of a communication system, and the so called terminal node may be a user equipment or a mobile station of the communication system. In addition, the so called communication system may be any appropriate communication system, such as LTE communication system, LTE-A communication system, or the like. In the following the LTE or LTE-A system is used as example. However, it should be noted that the disclosure should not be regarded as being limited to this example. Instead, the method and apparatus according to the disclosure can be applied to any communication system that supports contention based uplink data transmission.

For better understanding of the disclosure, the process of transmitting data from a terminal node in the communication system to the base station by using contention based uplink transmission resource is described with reference to FIG. 2.

Figure 2:
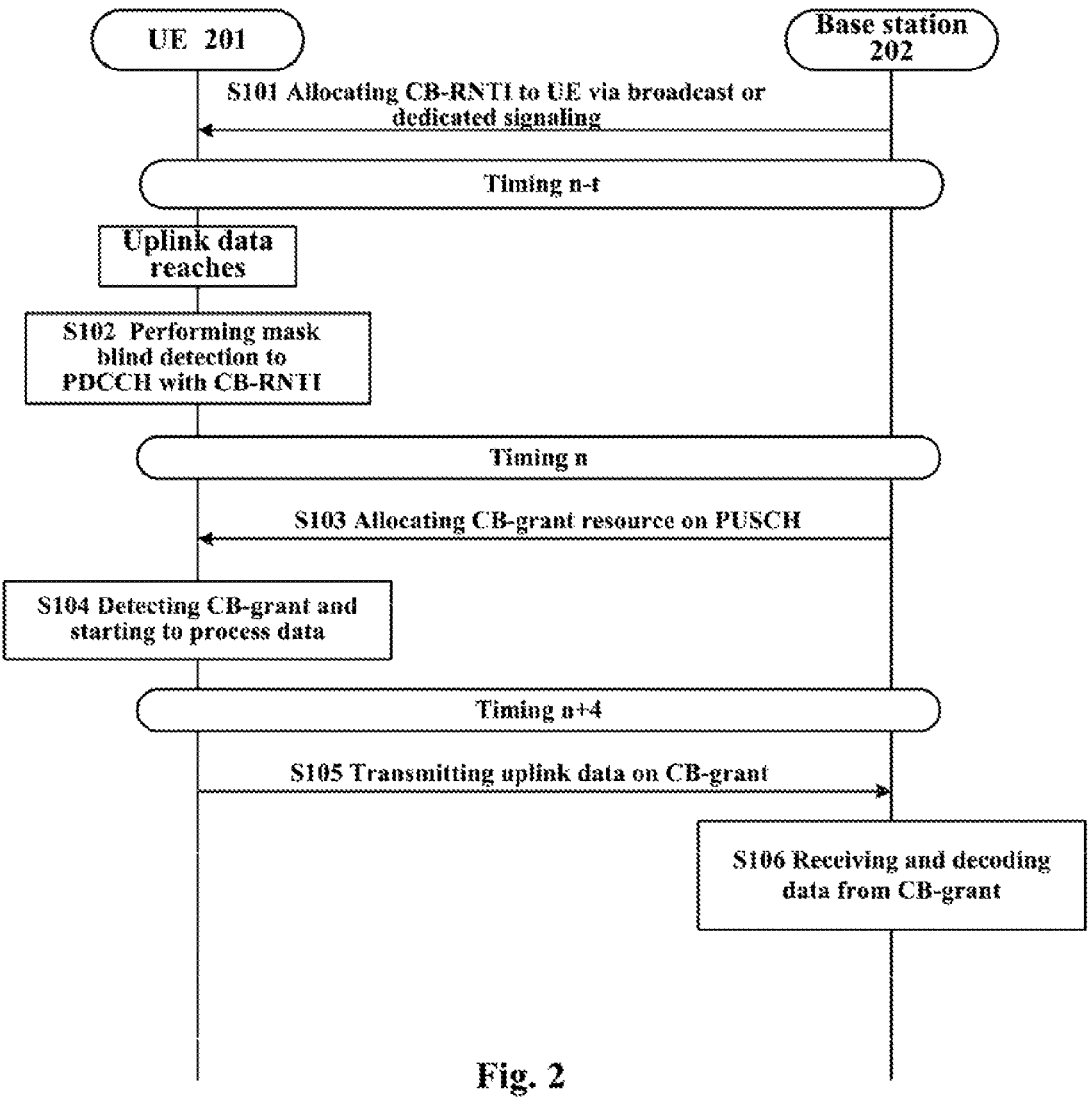
FIG. 2 is a schematic flow chart showing the process of transmitting data from a terminal node of the communication system to a base station by using contention based uplink transmission resources.

As shown in FIG. 2, in step S101, the main control node (e.g. the base station) 202 notifies the terminal node (e.g. the user equipment) 201 of the identifier of uplink resource available in contention based uplink transmission via a broadcast signaling or a dedicated signaling. As an example, the identifier may be a (Contention-Based Radio Network Temporary Identifier (CB-RNTI). In step S102, after receipt of the CB-RNTI, if the terminal node 201 needs to transmit uplink data, it performs a mask blind detection to the physical downlink control channel (PDCCH) by using the CB-RNTI in each of subsequent sub-frames. In step 103, the main control node determines whether to allocate uplink resources (e.g. CB-grant) on the physical uplink shared channel (PUSCH) in each sub-frame based on an appropriate scheduling algorithm. In the example, for conciseness it is supposed that the main control node 202 allocates a CB-grant on PUSCH in the nth downlink sub-frame and transmits the scheduling information to the terminal node via the PDCCH which is scrambled by using CB-RNTI. As an example, the scheduling information may be contained in DCI (Downlink Control Indicator) format 0 defined in the LTE standard, where the 1 bit NDI (New Data Indicator) of DCI format 0 may be set as "0", to indicate that the terminal node which has new data for transmission may use the uplink transmission resource identified by the CB-RNTI.

In step 104, when the terminal node 201 detects the CB-grant allocated on PUSCH in the nth downlink sub-frame by performing the mask blind detection to PDCCH using the CB-RNTI, if determining that the value of NDI in the DCI format transmitted on the PDCCH is 0, the terminal node 201 starts to process the data to be transmitted uplink and adds its identifier into the MAC PDU (Media Access Control layer Protocol Data Unit). As an example, the identifier of the terminal node may be a Cell-Radio Network Temporary Identifier (C-RNTI).

In step 105, the terminal node 201 transits uplink data to the main control node 202. As an example, it is supposed that the terminal node 201 transmits data through the CB-grant allocated by the main control node 201 on the PUSCH in the n+4$^{th}$ uplink sub-frame. In step 106, the main control node 202 receives the data from the terminal node on the CB-grant of the PUSCH in the n+4$^{th}$ uplink sub-frame and decodes the received data.

Figure 3:
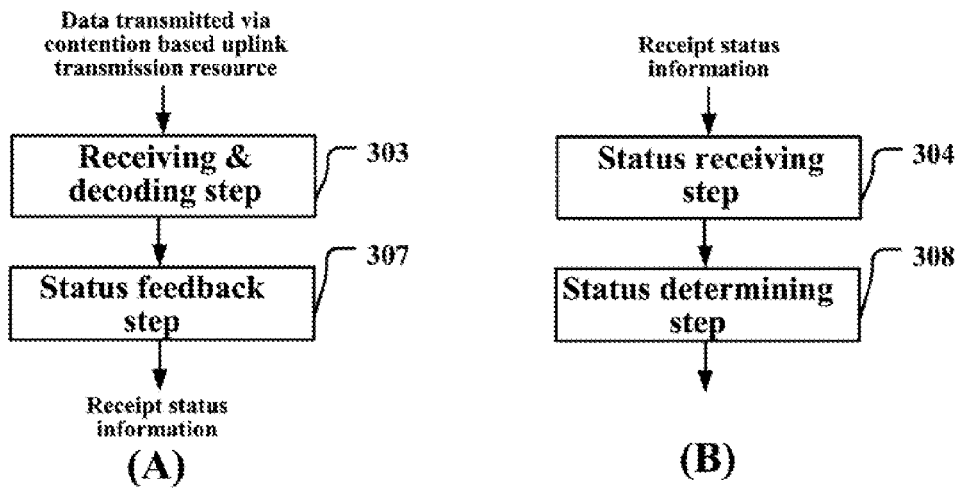
FIGS. 3(A) and (B) are schematic flow charts respectively illustrating a method of feeding data receipt status information from the main control node of the communication system back to a terminal node, and a method of receiving the data receipt status information by the terminal node, according to an embodiment of the disclosure.

FIG. 3(A) is a schematic flow chart illustrating a method of feeding data receipt status information from the main control node of the communication system back to a terminal node after the terminal node transmits uplink data in contention based manner according to an embodiment of the disclosure. As shown in FIG. 3(A), the method includes steps 303 and 307.

In step 303, the main control node receives data transmitted from each of terminal node(s) via contention based uplink transmission resource and decodes the data. This step is also called as a receiving and decoding step.

The contention based uplink transmission resource refers to uplink transmission resource which is allocated by the main control node in the communication system to a plurality of terminal nodes and is to be used by the plurality of terminal nodes to transmit uplink data in a contention based manner. For example, the CB-grant on PHSCH shown in FIG. 2 is an example of the contention based uplink transmission resource. It should be noted that this is merely an example, and the contention based uplink transmission resource can be any uplink resource that are available for contention based transmission, which is not numerated herein.

In step 307, the main control node returns to terminal nodes transmitting data via the uplink contention transmission resource, receipt status information which reflects whether the data transmitted by the terminal nodes has been successfully decoded. Thus the terminal nodes transmitting data via the uplink contention transmission resource can know whether the data they transmitted has been successfully received or not. This step is also called as status feedback step.

For example, the main control node may transmit the receipt status information by using MAC layer feedback signaling and schedule signaling transmitted via physical downlink control channel, or physical layer feedback signaling transmitted via physical Hybrid ARQ indicator channel or the like, or the combination of the above signaling.

With the above method, the base station can return to the terminal nodes transmitting data via the uplink contention transmission resource, receipt status information which reflects whether the data transmitted by the terminal nodes has been successfully decoded.

FIG. 3(B) is a schematic flow chart showing a method of receiving the receipt status information corresponding to the method shown in FIG. 3(A).

As shown in FIG. 3(B), in step 304, after transmitting data to the main control node via the contention based uplink transmission resource, the terminal node receives the receipt status information which reflects whether the data transmitted by the terminal node has been successfully decoded returned by the main control node. The step is also called as status receiving step. Then in step 308, the terminal node determines whether the data it transmits to the main control station has been received successfully based on the receipt status information. The step is also called as status determining step.

with the above method, each terminal node transmitting data via the contention based uplink transmission resource to the main control node can know in time the receipt status of the data.

In some embodiments, to feed back the receipt status of the data to each of the terminal nodes, the receipt status information transmitted from the main control node may include identifiers of terminal nodes, the data from which has been successfully decoded by the main control node. A terminal node may detect whether the main control node has returned its identifier, if yes (i.e. the received receipt status information contains its identifier), it may determine that the data transmitted by it has been successfully received. Otherwise, if the receipt status information does not contain the identifier of the terminal node, it may determine that the data transmitted by it has not been successfully received.

In the communication system, each terminal node has a corresponding identifier. For example, the identifier of a terminal node may be a C-RNTI or any other formats of identifier capable of identifying the terminal node, and the disclosure is not limited to any particular example.

Figure 4:
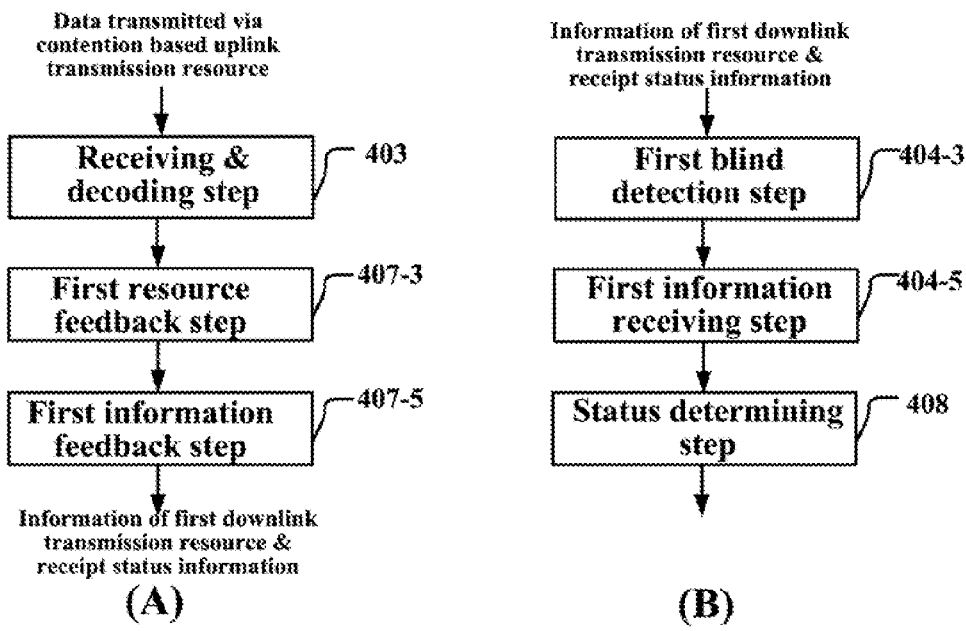
FIGS. 4(A) and (B) are schematic flow charts respectively illustrating a method of feeding back data receipt status information and a method of receiving the data receipt status information according to another embodiment of the disclosure.

FIG. 4(A) is a schematic flow chart illustrating a method of feeding back data receipt status information from the main control node of the communication system to a terminal node after the terminal node transmits uplink data in contention based manner according to another embodiment of the disclosure. In the embodiment, the main control node firstly schedules a downlink transmission channel, and then sends the receipt status information via the downlink transmission channel. For conciseness, in the embodiment the downlink transmission channel is also called as "the first downlink transmission channel".

As shown in FIG. 4(A), the method includes steps 403, 407-3 and 407-5.

Step 403 is similar to step 303 of FIG. 3(A), the description of which is not repeated here.

Step 407-3 and step 407-5 correspond to step 307 of FIG. 3(A). Particularly, in step 407-3 the main control node schedules the first downlink transmission channel for transmitting the receipt status information. More particularly, the main control node transmits a schedule signaling (also called as the first schedule signaling) including the information indicating the first downlink transmission resource via the physical downlink control channel scrambled by the identifier of the contention based uplink transmission resource. The step is also called as the first resource feedback step.

In the disclosure, the main control node may use any appropriate method to scramble a channel, the description of which is not detailed herein.

In the disclosure, an identifier of contention based uplink transmission resource may be any appropriate identifier for identifying the contention based uplink transmission resource. For example, it may be a CB-RNTI or any appropriate resource identifier of any format. The disclosure is not limited to any particular format thereof.

Then in step 407-5, the receipt status information is transmitted via the first downlink transmission resource. The main control node judges whether the received data has been decoded successfully and determines the data is from which terminal node (for example, the terminal node may transmit its identifier together with the data, so that the base station can obtain the identifier of the terminal node after it decodes the data from the terminal node successfully), and then includes the identifier of the terminal node (In the embodiment, referred to as the first terminal node) in the receipt status information to be fed back. The step is also called as the first information feedback step.

The first downlink transmission resource may any appropriate downlink transmission resource that can be used to transmit the receipt status information, such as physical downlink shared channel (e.g. PDSCH defined in LTE standard) or any other resources on downlink data transmission channel, the description of which is omitted herein.

With the above method, the base station may return the receipt status of the data transmitted by the terminal node via the contention based uplink transmission resource to the terminal node in time.

In the above embodiment, the receipt status information may include only the identifier of a terminal node, the data transmitted from which has been successfully received, while excluding the identifier of a terminal node, the data transmitted from which has not been received successfully. In this case, the terminal node may determine whether its data has been successfully received by judging wither its identifier is returned by the base station.

Figure 6:
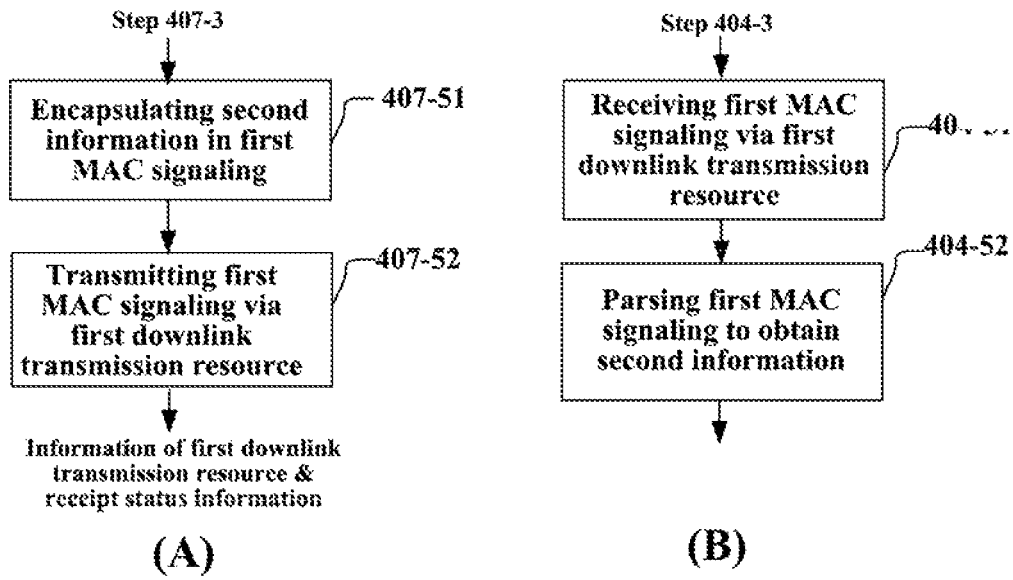
FIGS. 6(A) and (B) are schematic flow charts respectively illustrating a method of feeding back data receipt status information by the main control node by an MAC signaling and a method of receiving and processing the MAC signaling by the terminal node according to the embodiment of the disclosure.

In an example, the receipt status information may be transmitted via an MAC layer feedback signaling. FIG. 6(A) shows an example of transmitting the receipt status information by use of an MAC layer feedback signaling. As shown in FIG. 6(A), step 407-5 may include steps 407-51 and 407-52. In step 407-51, information (referred to as the second information) containing the receipt status information is encapsulated in an MAC signaling (referred to as the first MAC signaling), and then in step 407-52 the first MAC signaling is transmitted vi the first downlink transmission resource.

If the base station does not successfully decode the received data, the MAC signaling returned from it will not contain any identifier of terminal node. For example, in this case the MAC signaling may contain only a header and/or other information.

As an example, the first MAC signaling may further include a backoff indicator (BI) for instructing the terminal node to not transmit uplink data in a certain time period. The time period may include T units of time, and the value of T meets the following: $0 \leq T \leq BI$. The unit of time may be selected as require, the description of which is not detailed herein. Optionally, the main control node may include the BI in the MAC signaling in the case that no data is successfully decoded. And in the case that the data from a terminal node is decoded successfully, the main control node may also determine whether to instruct the terminal node to backoff according to the practical requirements, and if yes, insert the BI into the MAC signaling.

Figure 14:
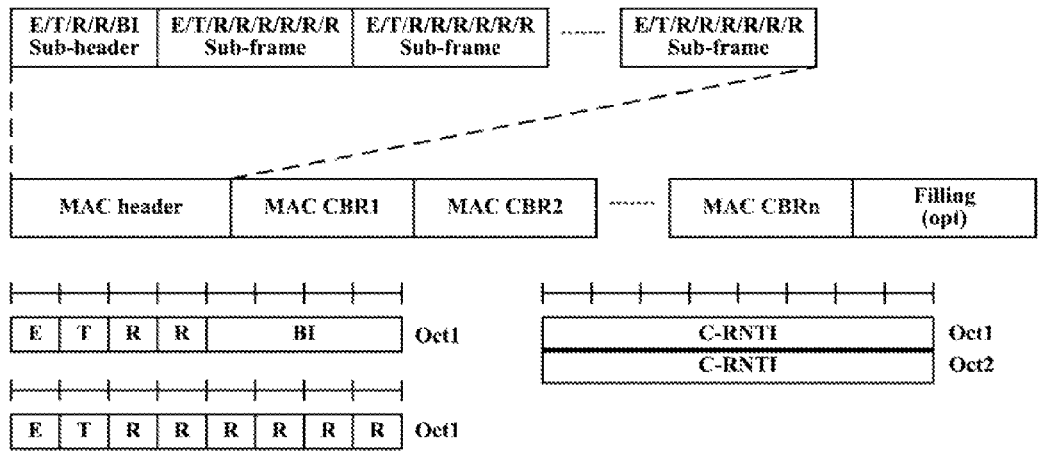
FIG. 14 shows the format of the MAC feedback signaling according to an embodiment of the disclosure.

FIG. 14 shows an example of the MAC signaling. As shown in FIG. 14, the MAC feedback signaling may include two sections: an MAC header and an MAC payload. The MAC header includes sub-headers. The MAC payload includes MAC CBRs (Contention-based response).

MAC sub-headers may be classified into two types, i.e. E/T/R/R/BI sub-header and E/T/R/R/R/R/R sub-header, in which:

E (1 bit) indicates whether the byte following the MAC sub-header in which it is provided is an MAC sub-header or an MAC CBR. Optionally, if E is "0", it indicates the following byte is an E/T/R/R/R/R/R sub-header; and if E is "1", it indicates that the following byte is an MAC CBR;

T (1 bit) indicates the type of the MAC sub-header. Optionally, if T is "0", the type is E/T/R/R/BI sub-header, and if T is "1", the type is E/T/R/R/R/R/R sub-header;

BI (4 bit) indicates the random backoff indicator which indicates the time scope of backoff; and R (1 bit) is a revered bit.

As an example, the MAC header contains only one E/T/R/R/BI sub-header at the most, and this E/T/R/R/BI sub-header has no corresponding MAC CBR. In MAC header, each E/T/R/R/R/R/R sub-header may correspond to one MAC CBR. Here, MAC CBR is the identifier of the terminal node. For example, such an identifier may be a C-RNTI of 16 bits.

It should be noted that the above structure of the MAC signaling is merely an example. In the disclosure, the MAC signaling should not be limited to this example structure; instead it may use any appropriate format, the description of which is omitted herein.

In the above example, the base station utilizes the MAC layer signaling to transmit the receipt status information, so that the terminal node can know in time whether the data it transmitted has been received successfully.

FIG. 4(B) shows an example of a method of receiving the receipt status information by a terminal node, which corresponds to the method shown in FIG. 4(A).

As shown in FIG. 4(B), the method includes steps 404-3, 404-5 and 408.

Steps 404-3 and 404-5 correspond to step 304 in FIG. 3(A). Particularly, in step 404-3, the terminal node (also called as the fourth terminal node) uses the identifier of the contention based uplink transmission resource to perform a mask blind detection to the physical downlink control channel. The step is also called as the first blind detection step.

In the disclosure, the terminal node may employ any appropriate method to perform the blind detection, the description of which is omitted herein.

When detecting the first schedule signaling transmitted from the base station on the physical downlink control channel by using the identifier of the contention based uplink transmission resource, the terminal node parses the first schedule signaling to obtain information of the first downlink transmission resource. Then in step 404-5, the terminal node receives the receipt status information returned from the main control node via the first downlink transmission resource. The step is also called as the first information receiving step. As an example, the main control node may transmit the information of the first downlink transmission resource by using the PDCCH signaling defined in LTE standard. In this case, if the terminal node successfully detects the PDCCH signaling when performing mask blind detection to the physical downlink control channel by using the identifier of the contention based uplink transmission resource, the terminal node can receive the receipt status information on the downlink transmission resource indicated by the schedule signaling in the DCI (Downlink Control Indicator) transmitted on the PDCCH.

The receipt status information includes the identifier of the terminal node, the data from which has been successfully received. Thus in step 408, the terminal node judges whether its own identifier is included in the information (that is, judges whether the identifier of the first terminal node included in the receipt status information is the identifier of the present terminal node), and if yes, the terminal node determines that the data transmitted by itself has been received successfully, otherwise, the terminal node determines that the data transmitted by itself has not been received successfully.

With the above method, after the terminal node transmits the data via the contention based uplink transmission resource, it may get known in time whether the data has been successfully received.

In the case that the receipt status information contains only the identifier of the first terminal node whose data has been received successfully, the data to be processed by the terminal node is small, and thus the processing efficiency may be improved.

FIG. 6(B) shows a method of receiving a MAC layer feedback signaling by a terminal node when the base station transmits the receipt status information by using the MAC layer feedback signaling as shown in FIG. 6(A). As shown in FIG. 6(B), when detecting the first schedule signaling transmitted from the base station on the physical downlink control channel by using the identifier of the contention based uplink transmission resource in step 404-3, the terminal node parses the first schedule signaling to obtain the information of the first downlink transmission resource. Then in step 404-51, the terminal node receives the first MAC signaling transmitted via the first downlink transmission resource. Then in step 404-52 the terminal node parses the first MAC signaling to obtain the receipt status information. In step 408, the terminal node determines whether its data has been received successfully based on the receipt status information. The detailed process is the same as described above, the description of which is not repeated here.

If the information returned from the main control node further includes the BI, the terminal node may obtain the value of BI by parsing the information. Then based on the value of BI, the terminal node does not transmit uplink data within a certain time period. The terminal node may select a backoff value T randomly from the scope of [0,BI]. The value T corresponds to the time period within which no uplink transmission is performed. After a delay of T units of time, the terminal node resumes the uplink transmission via the contention based uplink transmission resource. Optionally, during the backoff, the terminal node may choose to transmit a schedule request, requesting the base station to allocate a dedicated uplink transmission resource. If the received MAC feedback signaling does not contain the BI, the terminal node may choose to retransmit the data in the subsequently allocated contention based uplink transmission resource, or to transmit a schedule request, requesting the base station to allocate a dedicated uplink transmission resource for the retransmission.

As an example, in addition to the identifier of the first terminal node whose data has been successfully decoded, the receipt status information returned to the base station by the terminal node may further include indication information indicating whether the corresponding data has been successfully received. For example, 1 bit of indication information may be used to indicate whether the data from a terminal node is decoded successfully or not, for example, 0 indicates success and 1 indicates a failure. After receiving the receipt status information, the terminal node may determine whether the data it transmitted has been decoded successfully based on the indication information corresponding to its identifier.

As an example, if determining the data it transmitted has been decoded successfully, the terminal node may choose to transmit new data in the subsequently allocated contention based uplink transmission resource, or to transmit a schedule request, requesting the base station to allocate a dedicated uplink transmission resource. If determining the data it transmitted has not been decoded successfully, the terminal node may choose to retransmit the data in the subsequently allocated contention based uplink transmission resource, or to transmit a schedule request, requesting the base station to allocate a dedicated uplink transmission resource for the retransmission.

Figure 5:
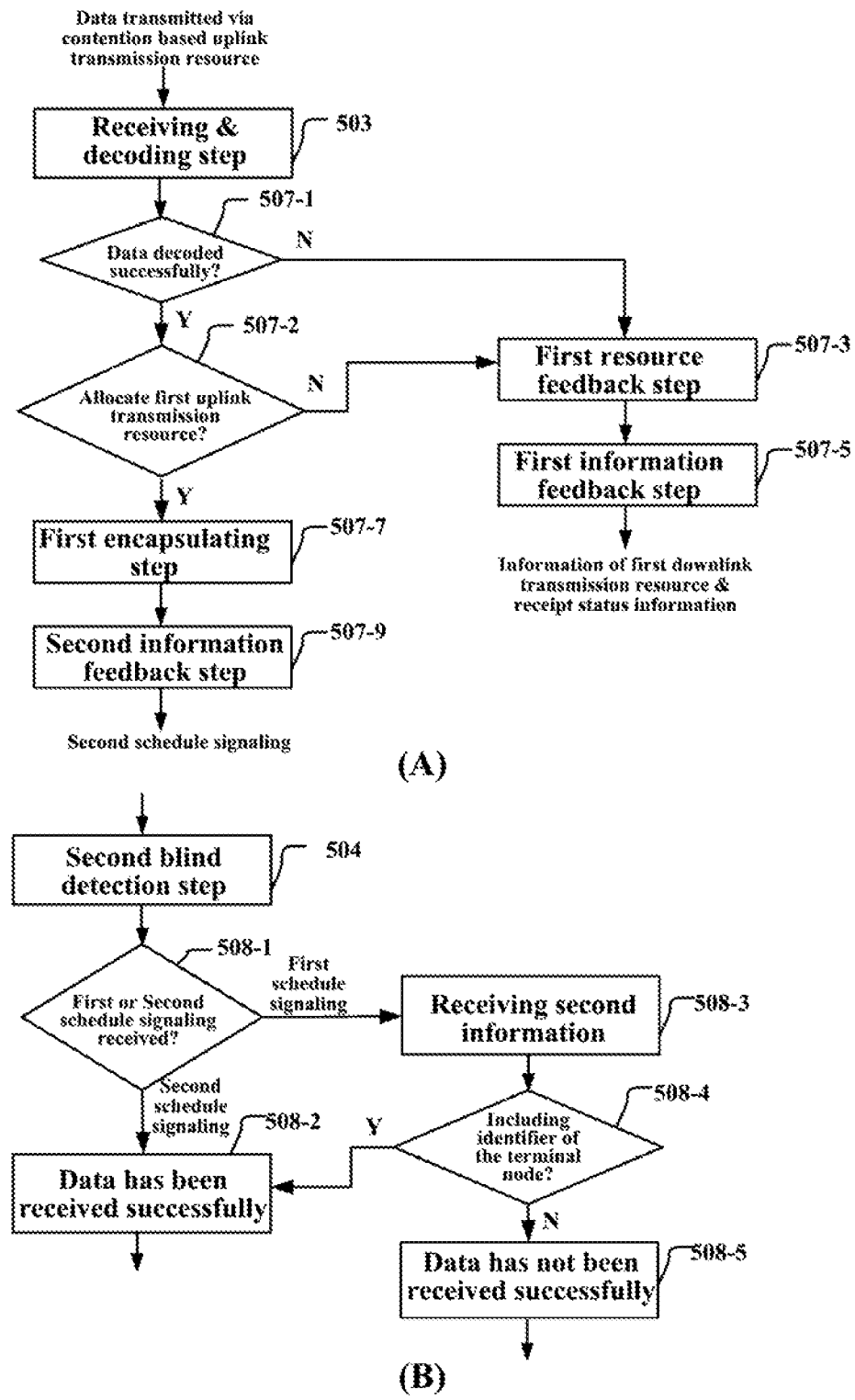
FIGS. 5(A) and (B) are schematic flow charts respectively illustrating a method of feeding back data receipt status information and a method of receiving the data receipt status information according to another embodiment of the disclosure.

FIG. 5(A) shows a method of returning the receipt status information of data when the main control node receives the data transmitted from the terminal node in contention based manner according to another embodiment. FIG. 5(B) shows a method of receiving the receipt status information, which corresponds to the method shown in FIG. 5(A).

In the embodiment, in the case that the data from a terminal node (In the embodiment, also called as the first terminal node) has been decoded successfully, the main control node determines whether to allocate new uplink transmission resource for the first terminal node. If yes, the main control node transmits a schedule signaling via the physical downlink control channel scrambled by using the identifier of the first terminal node to the first terminal node. In addition, the identifier(s) of the first terminal node(s) can be returned to each related terminal node. Otherwise, the main control node may return the receipt status information by using the method described above with reference to FIG. 4(A) or FIG. 6(a).

As shown in FIG. 5(A), the method of returning the receipt status information includes steps 503, 507-1, 507-2, 507-3, 507-5, 507-7 and 507-9.

Step 503 is similar to step 303 or 403, the description of which is not repeated here.

Steps 507-1, 507-2, 507-3, 507-5, 507-7 and 507-9 are similar to the status feedback step described above.

Particularly, in step 507-1, the main control node determines whether the received data has been decoded successfully, if no, it performs step 507-3 and step 507-9. Step 507-3 and step 507-9 are similar to step 407-3 and step 407-5 described above with reference to FIG. 4(A) or FIG. 6(A), respectively, the description of which is not repeated here.

If the main control node successfully decodes the received data (the terminal node transmitting the data is the first terminal node), in step 507-2 the main control node determines whether to allocate to the first terminal node new uplink transmission resource (referred to as the first uplink transmission resource). The step is also called as the first resource allocating step.

The main control node determines whether to allocate to the first terminal node the first uplink transmission resource by using any appropriate schedule algorithm. Optionally, the data from the terminal node may include information indicating its buffer status, such as the Buffer Status Report (BSR) defined in LTE. In this case, the main control node may decide whether to allocate the uplink transmission resource based on this information indicating the buffer status and the currently used schedule algorithm, the description of which is omitted here.

The first uplink transmission resource may be any appropriate uplink transmission resource, such as the physical uplink shared channel (e.g. PUSCH in LTE), the description of which is omitted here.

If it is determined to allocate to the first terminal node the first uplink transmission resource, step 507-7 and step 507-9 are performed. That is the main control node schedule the first uplink transmission resource by using the physical downlink control channel scrambled by the identifier of the first terminal node. Otherwise, steps 507-3 and 507-5 are performed.

Particularly, in step 507-7, the information indicating the first uplink transmission resource allocated to the first terminal node is encapsulated in a schedule signaling (referred to as the second schedule signaling). The step is also called as the first encapsulating step. Then in step 507-9, the second schedule signaling is transmitted via the physical downlink control channel scrambled by the identifier of the first terminal node. In this way a terminal node may know the receipt status of the data transmitted from it and the information of the first uplink transmission resource. The step is also called as the second information feedback step.

With the above method, the base station may return the receipt status of the data transmitted from the contention based uplink transmission resource to the related terminal nodes in time. In addition, if the base station successfully decodes the data from the first terminal node and allocate to the first terminal node new uplink transmission resource, the base station may transmit the schedule information by using the physical downlink control channel scrambled by the identifier of the first terminal node, to notify the first terminal node of the newly allocated uplink transmission resource in time, while returning the receipt status information to related terminal nodes. In this way, the transmission resources may be saved, thereby improving the transmission efficiency of the system.

As shown in FIG. 5(B), the method of receiving the receipt status information by the terminal node includes steps 504, 508-1, 508-2, 508-3, 508-4 and 508-5.

Step 504 is different from step 404 in that, in step 504 the terminal node not only uses the identifier of the contention based uplink transmission resource to perform a mask blind detection to the physical downlink control channel, but also uses the identifier of it to perform the mask blind detection to the physical downlink control channel. The step is also called as the second blind detection step.

Step 508-1, 508-2, 508-3, 508-4 and 508-5 correspond to the status determining step described above. Particularly, in step 508-1 the terminal node determines whether the second schedule signaling from the base station is received by using the identifier of the present terminal node, or determines whether the first schedule signaling is detected by using the identifier of the contention based uplink transmission resource. If the second schedule signaling is detected by its own identifier, in step 508-2 the terminal node determines that the data it transmitted has been received successfully. As an example, the schedule information indicating the first uplink transmission resource may be included in PDCCH DCI format 0 defined in LTE. If the terminal node detects PDCCH DCI format 0 by using its identifier, the terminal node may determine that the data it transmitted has been received successfully.

When receiving the first schedule signaling containing the first information indicating the first downlink transmission resource by using the identifier of the contention based uplink transmission resource, in step 508-3 the terminal node receives the second information containing the receipt status information returned via the first downlink transmission resource from the main control node. In step 508-4 the terminal node determines whether its identifier is included in the second information, if yes, the terminal node may determine that the data it transmitted has been received successfully in step 508-2, otherwise, the terminal node may determine that the data it transmitted has not been received successfully in step 508-5.

After receiving the second schedule signaling, the terminal node may parse the second schedule signaling to obtain the schedule information (i.e. the information indicating the first uplink transmission resource); and continue to transmit data on the first uplink transmission resource. As described above, the first uplink transmission resource may be a resource on the physical uplink shared channel (e.g. PUSCH in LTE). For example, if the terminal node detects PDCCH DCI format 0 by using the identifier thereof, it may transmit data by using the uplink transmission resource (for example, PUSCH resource) indicated in the schedule signaling of the DCI format 0 in a subsequent uplink sub-frame.

In the above method, when the base station successfully decodes the data from a terminal node (the first terminal node) and allocates to the first terminal node new uplink transmission resource, the schedule information is transmitted via the physical downlink control channel scrambled by the identifier of the first terminal node. The first terminal node uses its identifier to perform a mask blind detection to the physical downlink control channel to know in time whether the data transmitted by it has been received successfully and to obtain the newly allocated uplink transmission resource, thereby the transmission efficiency may be further improved.

As an example, step 507-5 may further include steps 407-51 and 407-52 described above with reference to FIG. 6 and step 508-4 may further include steps 404-51 and 404-52 described above with reference to FIG. 6. In other words, similar to the above embodiments, if the received data is not successfully decoded or if the first uplink transmission resource is not allocated to the first terminal node, the main control node may use the MAC signaling to return the receipt status information. The format, contents, transmission manner, and receipt manner of the MAC signaling are the same as described in the above embodiment. For example, the MAC signaling may include a backoff indicator (BI) and the like, the description of which is not repeated here.

Figure 7:
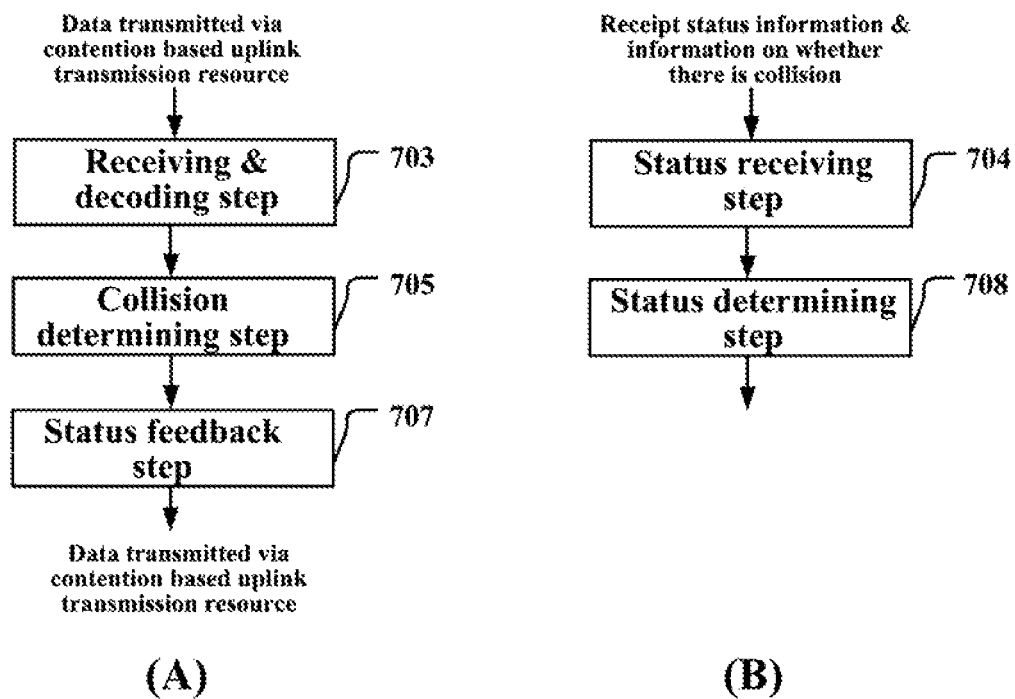
FIGS. 7(A) and (B) are schematic flow charts respectively illustrating a method of feeding back data receipt status information and a method of receiving the data receipt status information according to another embodiment of the disclosure.

FIG. 7(A) shows a method of returning the receipt status information of data when the main control node receives the data transmitted from the terminal node in contention based manner according to another embodiment. FIG. 7(B) shows a method of receiving the receipt status information, which corresponds to the method shown in FIG. 7(A). In the embodiment, the main control node of the communication system (i.e. the base station) has the capability of determining whether there is collision among the data from a plurality of user equipments on the contention based uplink resource.

As shown in FIG. 7(A), the method of returning information from the main control node includes steps 703, 705 and 707.

In step 703, the main control node receives the data transmitted from the terminal node via the contention based uplink transmission resource and decodes the data. The step is similar to the receiving and decoding step described above, the description of which is not repeated here.

In step 705, the main control node determines whether there is data collision on the contention based uplink transmission resource. In other words, it judges whether there are a plurality of terminal nodes simultaneously transmit data on the contention based uplink transmission resource. The main control node may judge whether there is the collision by using any appropriate method, the description of which is omitted here.

In step 707, the main control node returns to the terminal nodes, which transmit data via the contention based uplink transmission resource, the receipt status information reflecting whether the data from each of the terminal nodes has been decoded successfully and the information indicating whether there is data collision on the contention based uplink transmission resource.

The main control node may transmit the information by using any appropriate downlink resource, such as physical hybrid ARQ indicator channel and/or other downlink transmission channel.

With the above method, the main control node may return the receipt status information and the information indicating whether there is collision to the terminal nodes, thereby the terminal nodes may know in time the receipt status of the data and the collision on the transmission resource.

As shown in FIG. 7(B), the method of receiving the information by the terminal node includes steps 704 and 708.

In step 704, after the terminal node transmits data via the contention based uplink transmission resource to the main control node in the communication system, it monitors the corresponding downlink transmission channel to receive the receipt status information reflecting whether the data from the terminal node has been decoded successfully and the information indicating whether there is data collision on the contention based uplink transmission resource return from the main control node. The step is also called as status receiving step. Then in step 708 the terminal node determines whether the data it transmits has been successfully received based on the information. In addition, the terminal node may know whether there is data collision on the contention based uplink transmission resource based on the information.

With the above method, each terminal node which transmits data via the contention based uplink transmission resource to the main control node can know the receipt status of its data. In addition, the terminal node may further know whether there is data collision on the contention based uplink transmission resource based on the information.

Figure 8:
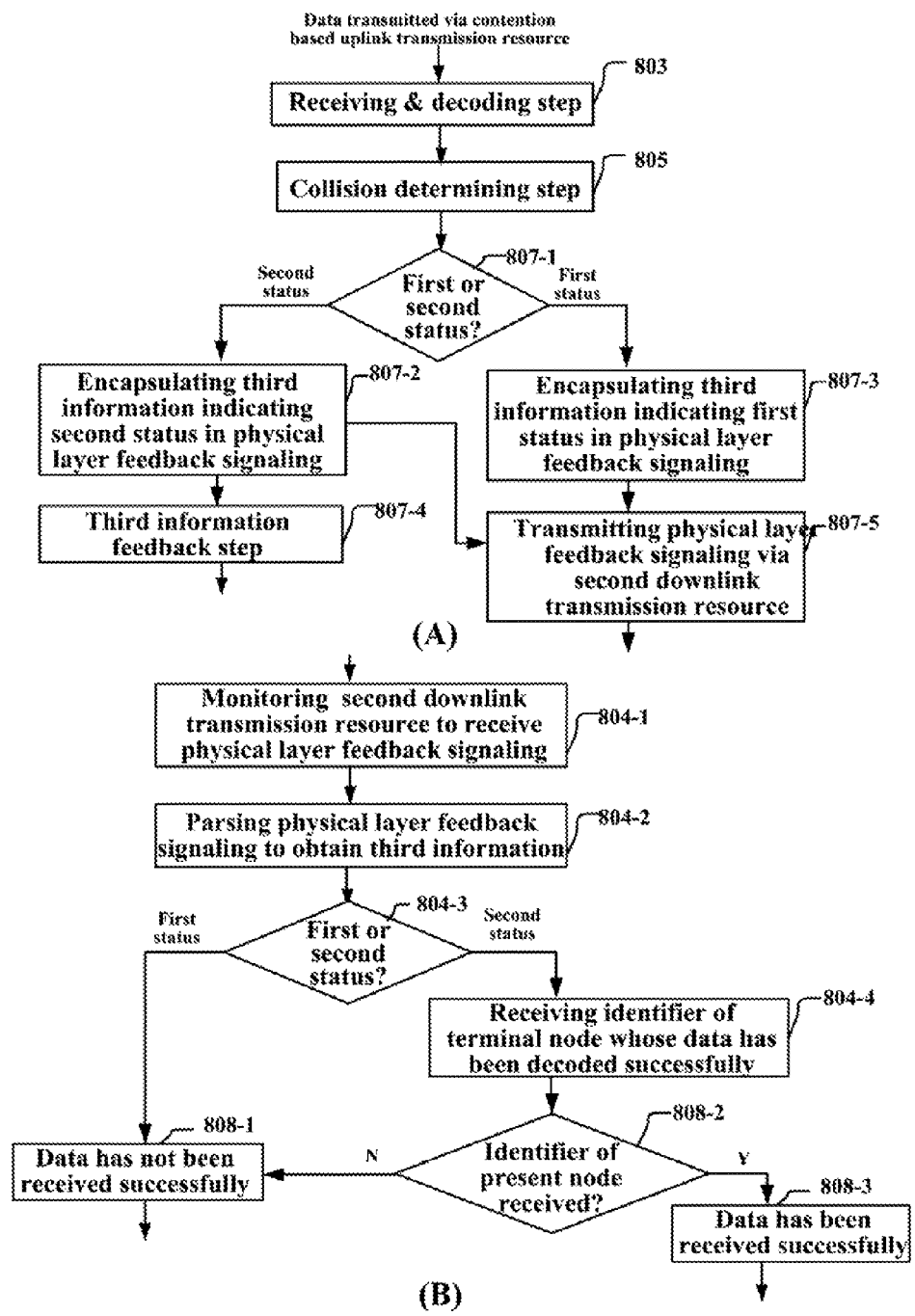
FIGS. 8(A) and (B) are schematic flow charts respectively illustrating a method of feeding back data receipt status information and a method of receiving the data receipt status information according to another embodiment of the disclosure.

FIG. 8(A) shows a method of returning the receipt status information of data when the main control node receives the data transmitted from the terminal node in contention based manner according to another embodiment. FIG. 8(B) shows a method of receiving the receipt status information, which corresponds to the method shown in FIG. 8(A). Similar to the embodiment shown in FIG. 7, in FIG. 8 the main control node of the communication system (i.e. the base station) has the capability of determining whether there is collision among the data from a plurality of user equipments on the contention based uplink resource. In addition, in the embodiment of FIG. 8, the base station returns the information via the physical layer feedback signaling to the terminal node.

As shown in FIG. 8(A), the method of returning information from the main control node includes step 803, 805, 807-1, 807-2, 807-3, 807-4 and 807-5.

Step 803 is similar to step 703, the description of which is not repeated here.

In step 805, the main control node determines whether there is collision on the contention based uplink transmission resource. In other words, it judges whether there are a plurality of terminal nodes simultaneously transmit data on the contention based uplink transmission resource.

In step 807-1, the main control node determines whether it is in the first status or the second status based on the information indicating whether there is collision and the information indicating whether the data has. If there is no collision on the contention based uplink transmission resource and the data has not been successfully decoded, the main control node determines that it is in the first status. If there is no collision on the contention based uplink transmission resource and the data has been successfully decoded, the main control node determines that it is in the second status.

In the case of the first status, the information indicating the first status is encapsulated in a physical layer feedback signaling (referred to as the first physical layer feedback signaling) in step 807-2. In step 807-5 the first physical layer feedback signaling is sent to the related terminal nodes via a downlink transmission resource (referred to as the second downlink transmission resource).

In the case of the second status, the information indicating the second status is encapsulated in the first physical layer feedback signaling in step 807-3. In step 807-5 the first physical layer feedback signaling is sent to the related terminal nodes via the second downlink transmission resource.

In addition, in the case of the second status, the identifier of the terminal node (referred to as the second terminal node), the data from which has been successfully decoded, is returned to the related terminal nodes in step 807-4.

In the embodiment, the information indicating the first status or the second status is referred to as the third information. Since the information indicates two statues, it may be encapsulated in a physical layer feedback signaling of 1 bit. For example, when the 1 bit of the physical layer feedback signaling is set as "0", it indicates the first status; and when the 1 bit is set as "1", it indicates the second status; and vice versa.

With the above method, the main control node may return the receipt status of data and the information of the collision to the terminal nodes, thereby the terminal nodes can know in time the receipt status of data and whether there is data collision. In addition, in the case of the first status, only 1 bit of physical layer feedback signaling needs to be transmitted, to notify the receipt status information and the collision information to the terminal node from the base station. In this way, the processing load is reduced and the processing efficiency is improved.

As shown in FIG. 8(B), the method of receiving information by the terminal node includes steps 804-1, 804-2, 804-3, and 804-4, as well as steps 808-1, 808-2 and 808-3.

In step 804-1, the terminal node monitors the second downlink transmission resource, to receive the first physical layer feedback signaling containing the third information indicating one of the first status and the second status. In step 804-2, the terminal node parses the first physical layer feedback signaling to obtain the third information.

In step 804-3, the terminal node determines whether the third information indicates the first status. As described above, the third information may contain only 1 bit. For example, if the third information is set as "0", it indicates the first status; and when the 1 bit is set as "1", it indicates the second status. In the case of the first status, the terminal node determines that the data it transmitted is not receipt successfully in step 808-1 and there is no transmission collision on the contention based uplink transmission resource. In the case of the second status, the terminal node receives the information (referred to as the fifth information) containing the identifier of the second terminal node the data from which has been successfully decoded transmitted from the main control node in step 804-4. Then in step 808-2 the terminal node determines whether the fifth information contains its identifier, if yes, it may determine that the data from the present terminal node has been successfully decoded, otherwise, it may determine that the data from the present terminal node has not been successfully decoded.

With the above method, in the first status, only 1 bit of physical layer feedback signaling needs to be transmitted to notify the terminal nodes that there is no collision on the contention based uplink transmission resource and that the data has not been received successfully. In this way, the processing load is reduced and the processing efficiency is improved.

As an example, in the case of the first status, the base station may choose to allocate to the terminal node new uplink transmission resource. For example, the base station utilizes the physical downlink control channel scrambled by the identifier of the contention based uplink transmission resource to transmit a schedule signaling to allocate the contention based uplink transmission resource for contention based transmission. At the side of the terminal node, when the terminal node determines that it is in the first status, the terminal node utilizes the identifier of the contention based uplink transmission resource to perform a mask blind detection to the physical downlink control channel to obtain the schedule signaling. For example, the schedule signaling may be DCI format 0 transmitted via PDCCH in LTE standard, where NDI may be set as "1" to indicate the terminal node to retransmit the data. And when the terminal node detects DCI format 0 and determines that the NDI therein is 1, the terminal node may use the uplink transmission resource indicated by the schedule information in DCI format 0 to retransmit the data. Particularly, if the terminal node determines that the NDI is 1, it stops the mask blind detection to the physical downlink control channel by using the identifier of the contention based uplink transmission resource, and utilizes the uplink transmission resource indicated by the schedule information in DCI format 0 to retransmit the data in a subsequent uplink sub-frame (e.g. the (n+12)th sub-frame). Since the NDI is set as 1, other terminal nodes will not utilize the uplink transmission resource indicated by the schedule information in DCI format 0 to retransmit the data.

As another example, in the case of the first status, the terminal node may transmit to the base station a schedule request, requesting the base station to allocate uplink transmission resource for it, the description of which is omitted here.

Figure 9:
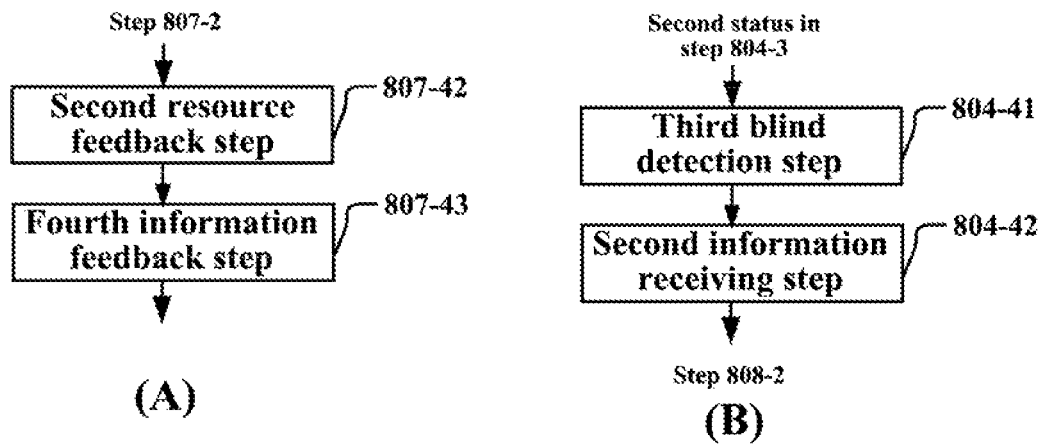
FIGS. 9(A) and (B) respectively illustrate particular examples of the status feedback step shown in FIG. 7(A) and the status receiving step shown in FIG. 7(B)

FIG. 9(A) shows an example of step 807-4 (the step of returning the identifier of the second terminal node) of FIG. 8(A), and FIG. 9(B) show an example of step 804-4 of FIG. 8(B).

In the example, the main control node firstly schedules a downlink transmission channel (referred to as the third downlink transmission channel), and then transmits the identifier of the second terminal node via the downlink transmission channel.

As shown in FIG. 9(A), step 807-4 may include steps 807-42 and 807-43.

In step 807-42, the main control node firstly schedules the third downlink transmission channel for transmitting the identifier of the second terminal node. Particularly, the main control node uses the physical downlink control channel scrambled by the identifier of the contention based uplink transmission resource to transmit the schedule signaling (also called as the third schedule signaling) containing the information (also called as the fourth information) indicating the third downlink transmission resource. The step is also called as the second resource feedback step.

In step 807-43, the identifier of the second terminal node is sent via the third downlink transmission resource. The main control node determine whether the received data is successfully decoded and determines the data is from which terminal node (for example, the terminal node may transmit its identifier together with the data and the base station may obtain the identifier of the terminal node after decoding successfully the data from the terminal node), and then encapsulates the identifier of the terminal node (referred to as the second terminal node) in the fourth information. The step is also called as the fourth information feedback step.

The third downlink transmission resource may be any appropriate downlink transmission resource suitable for transmitting the receipt status information, such as the resource on the physical downlink shared channel (e.g. PDSCH in LTE standard) or any other down link transmission channel, the description of which is omitted here.

As shown in FIG. 9(B), step 804-4 for receiving the fifth information containing the identifier of the second terminal node from the main control node includes step 804-41 and 804-42.

In step 804-41, the terminal node (also called as the fourth terminal node) utilizes the identifier of the contention based uplink transmission resource to perform a mask blind detection to the physical downlink control channel. The step is also called as the third blind detection step.

When detecting the third schedule signaling from the base station on the physical downlink control channel by using the identifier of the contention based uplink transmission resource, the terminal node parses the third schedule signaling to obtain the information of the third downlink transmission resource. Then in step 804-42, the terminal node receives the fifth information via the third downlink transmission resource. The step is also called as the second information receiving step. The step is similar to the step described above with reference to FIG. 4(B), the description of which is not repeated here.

In an example, the identifier of the second terminal node may be transmitted via the MAC layer feedback signaling. For example the method similar to that shown in FIG. 6(A) may be used. Particularly, step 807-43 for transmitting the identifier of the second terminal node via the third downlink transmission resource may include: encapsulating the fifth information including the identifier of the second terminal node in an MAC signaling (referred to as the second MAC signaling), and transmitting the second MAC signaling via the third downlink transmission resource. The format, contents, transmission manner and receiving manner of MAC signaling may be similar to the above embodiments, for example, the MAC signaling may include a backoff indicator (BI), the description of which is not repeated here.

In the example, the terminal node may receive the identifier by using the method shown in FIG. 6(B). Particularly, step 804-42 for receiving the fifth information via the third downlink transmission resource may include: receiving the second MAC signaling via the third downlink transmission resource, and parsing the second MAC signaling to obtain the fifth information. In the example, if the second MAC signaling from the main control node further includes a BI, the terminal node may obtain the value of BI by parsing the information. Then the terminal node may execute the following processing by using the above described method, the description of which is not repeated here.

Figure 10:
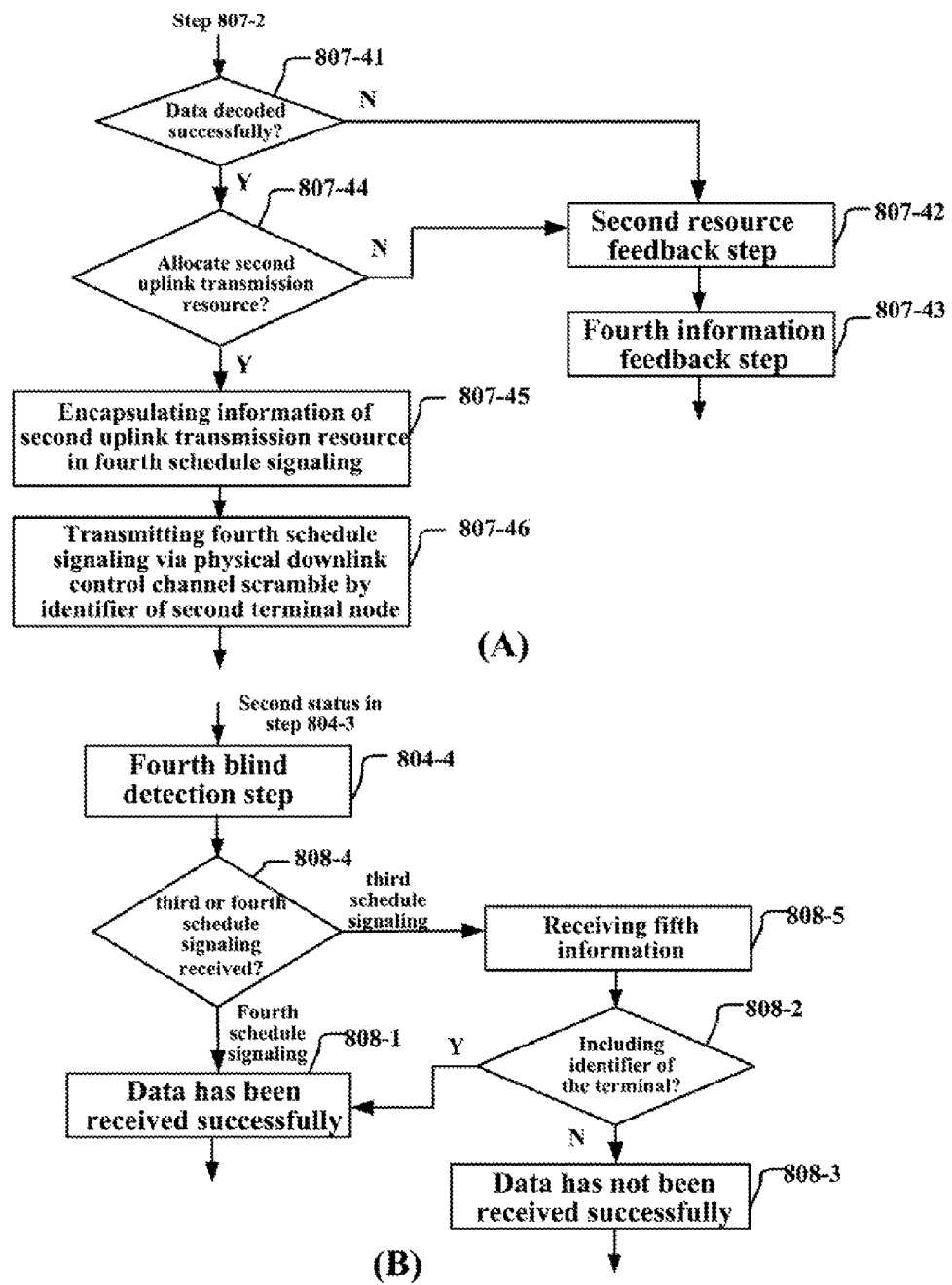
FIGS. 10(A) and (B) respectively illustrate other particular examples of the status feedback step shown in FIG. 7(A) and the status receiving step shown in FIG. 7(B)

FIG. 10(A) shows another example of step 807-4 (the step of returning the identifier of the second terminal node) of FIG. 8(A), and FIG. 10(B) show an example of corresponding receiving method.

As shown in FIG. 10(A), step 807-4 may include steps 807-41, 807-42, 807-43, 807-44, 807-45 and 807-46.

In step 807-41, the main control node determines whether the received data has been successfully decoded, if no, executes steps 807-42 and 807-43, which are similar to those shown in FIG. 9(A), the description of which is not repeated here. If the data from a terminal node (the second terminal node) has been successfully decoded, in step 807-44 the main control node determines whether to allocate to the second terminal node new uplink transmission resource (referred to as the second uplink transmission resource).

The main control node may allocate to uplink transmission resource the second terminal node by using any appropriate schedule algorithm. Optionally, the data from the terminal node may include information indicating its buffer status (e.g. Buffer Status Report (BSR) in LTE). In this case, the main control node may decide whether to allocate the uplink transmission resource based on the information indicating the buffer status and the currently used schedule algorithm, the description of which is omitted here.

The second uplink transmission resource may be any appropriate uplink transmission resource, such as an uplink shared transmission channel (e.g. PUSCH in LTE standard), the description of which is omitted here.

If not to allocate the second uplink transmission resource to the second terminal node, the main control node executes steps 807-42 and 807-43; otherwise, the main control node executes steps 807-45 and 807-46, i.e. schedules the second uplink transmission resource by using the physical downlink control channel scrambled by the identifier of the second terminal node. Particularly, in step 807-45, the main control node encapsulates the information indicating the second uplink transmission resource allocated to the second terminal node in a schedule signaling (referred to as the fourth schedule signaling). Then in step 807-46, the main control node transmits the fourth schedule signaling by using the physical downlink control channel scrambled by the identifier of the second terminal node.

As shown in FIG. 10(B), after determining that the third information indicates the second status in step 804-3, the terminal node performs the blind detection in step 804-4. In step 804-4, the terminal node not only uses the identifier of the contention based uplink transmission resource to perform a mask blind detection to the physical downlink control channel, but also uses the identifier of the present terminal node to perform a mask blind detection to the physical downlink control channel. The step is also called as the fourth blind detection step.

In step 808-4, the terminal node determines whether the fourth schedule signaling from the base station is received by using the identifier of the present terminal node, or whether the third schedule signaling is detected by using the identifier of the contention based uplink transmission resource.

If the fourth schedule signaling from the base station is received by using the identifier of the present terminal node, in step 808-1 the terminal node determines that the data it transmits has been received successfully. As an example, the schedule information indicating the first uplink transmission resource may be included in PDCCH DCI format 0 defined in LTE standard. If the terminal node detects PDCCH DCI format 0 by using its identifier, the terminal node may determine that the data it transmits has been received successfully.

After receiving the fourth schedule signaling, the terminal node may parse the fourth schedule signaling to obtain the schedule information (i.e. the information indicating the second uplink transmission resource); and continue to transmit data on the second uplink transmission resource. As described above, the second uplink transmission resource may be a resource on the physical uplink shared channel (e.g. PUSCH in LTE). For example, if the terminal node detects PDCCH DCI format 0 by using its identifier, it may transmit data on the uplink transmission resource (e.g. PUSCH resource) indicated by the schedule signaling contained in DCI format 0 in an appropriate uplink sub-frame (e.g. the (n+12)th sub-frame).

After the third schedule signaling containing the information indicating the third downlink transmission resource is received by using the identifier of the contention based uplink transmission resource, in step 808-5 the terminal node receives the fifth information from the main control node via the third downlink transmission resource. For example, when PDCCH is detected by using the identifier of the contention based uplink transmission resource, the terminal node receives the fifth information via the downlink resource indicated by the schedule signaling in DCI of the PDCCH (the third downlink transmission resource).

In step 808-2 the terminal node determines whether its identifier is included in the fifth information, if yes, the terminal node may determine that the data it transmits has been received successfully in step 808-1. Otherwise, the terminal node may determine that the data it transmits has not been received successfully in step 808-3.

As an example, if determining that the data it transmits has been received successfully, the terminal node may wait for the base station to schedule a dedicated uplink resource to it for transmitting new data, or may transmit a schedule request, requesting the base station to allocate a dedicated uplink transmission resource. If determining that the data it transmits has not been received successfully, the terminal node may retransmit the data in the subsequently allocated contention based uplink transmission resource, or may transmit a schedule request, requesting the base station to allocate a dedicated uplink transmission resource for data retransmission.

As an example, step 807-43 for transmitting the identifier of the second terminal node via the third downlink transmission resource may include: encapsulating the fifth information containing the identifier of the second terminal node in the second MAC signaling and transmitting the second MAC signaling via the third downlink transmission resource. Accordingly, step 808-5 of receiving the fifth information may include: receiving the second MAC signaling via the third downlink transmission resource, and parsing the second MAC signaling to obtain the fifth information. The format, contents, transmission manner, and receipt manner of the MAC signaling are the same as described in the above embodiment. For example, the MAC signaling may include a backoff indicator (BI) and the like, the description of which is not repeated here. If the second MAC signaling from the main control node further includes the BI, the terminal node may obtain the value of BI by parsing the information. Then based on the value of BI, the terminal node may perform the subsequent processing, the description of which is not repeated here.

Figure 11:
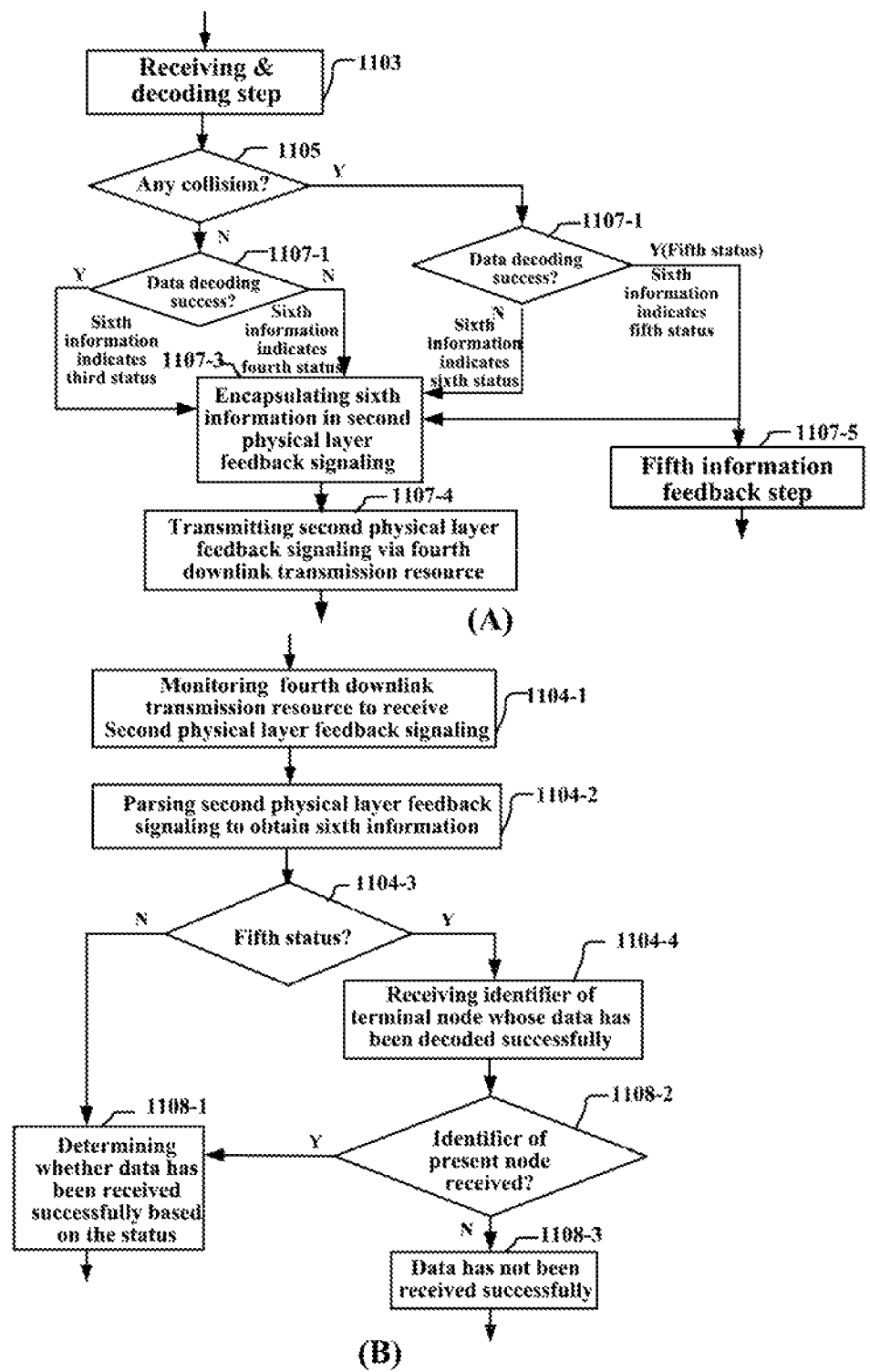
FIGS. 11(A) and (B) are schematic flow charts respectively illustrating a method of feeding back data receipt status information and a method of receiving the data receipt status information according to another embodiment of the disclosure.

FIG. 11(A) shows a method of returning the receipt status information of data when the main control node receives the data transmitted from the terminal node in contention based manner according to another embodiment. FIG. 11(B) shows a method of receiving the receipt status information, which corresponds to the method shown in FIG. 11(A). Similar to the embodiment shown in FIG. 7 or 8, in the embodiment of FIG. 11 the main control node of the communication system (i.e. the base station) has the capability of determining whether there is collision among data from a plurality of user equipments on the contention based uplink resource. In addition, in the embodiment of FIG. 11, the base station returns information to the terminal node via the physical layer feedback signaling.

As shown in FIG. 11(A), the method of returning information from the main control node includes steps 1103, 2105, 1107-1, 1107-3, 1107-4 and 1107-5.

Step 1103 is similar to step 703 or 803, the description of which is not repeated here.

In step 1105, the main control node determines whether there is transmission collision on the contention based uplink transmission resource, i.e. judges whether there is a plurality of terminal nodes simultaneously transmit data on the contention based uplink transmission resource.

In step 1107-1, the main control node further determines whether the received data is decoded successfully.

If there is no collision on the contention based uplink transmission resource and the received data is decoded successfully, it is determined as the third status; if there is no collision on the contention based uplink transmission resource and the received data is not decoded successfully, it is determined as the fourth status; if there is uplink transmission collision on the contention based uplink transmission resource and the received data from a terminal node (referred to as the third terminal node) is decoded successfully, it is determined as the fifth status; and if there is collision on the contention based uplink transmission resource and the received data is not decoded successfully, it is determined as the sixth status.

In step 1107-3, information (referred to as the sixth information) indicating one of the third status, the fourth status, the fifth status and the sixth status is encapsulated in a physical layer feedback signaling (referred to as the second physical layer feedback signaling), and in step 1107-4 the second physical layer feedback signaling is transmitted to the terminal node via a downlink transmission resource (referred to as the fourth downlink transmission resource).

In addition, in the case of the fifth status, in step 1107-5 the identifiers of the terminal nodes (referred to as the third terminal nodes) are also transmitted to the related terminal nodes whose data is decoded successfully.

In the embodiment, the sixth information indicates one of 4 statues, thus the sixth information may be encapsulated in a 2 bits (or more bits) of physical layer feedback signaling. For example, if the bits of the physical layer feedback signaling are set as "00", it indicates the third status; if set as "01", it indicates the fourth status; if set as "10", it indicates the fifth status, and if set as "11", it indicates the sixth status.

With the above method, in most statuses (the third, fourth and sixth statuses), only 2 bits of physical layer feedback signaling are needed to transmit both the receipt status information of the data and the information regarding collision to the terminal nodes. In this way, the processing amount is reduced significantly and the processing efficiency is improved.

As shown in FIG. 11(B), the method of receiving information by the terminal node includes steps 1104-1, 1104-2, 1104-3, 1104-4, 1108-1, 1108-2 and 1108-3.

In step 1104-1, the terminal node monitors the fourth downlink transmission resource to receive the second physical layer feedback signaling containing the sixth information. In step 1104-2, the terminal node parses the second physical layer feedback signaling to obtain the sixth information.

In step 1104-3, the terminal node determines whether the sixth information indicates the fifth status. As described above, the sixth information may contain only 2 bits. If it is not the fifth status, then in step 108-1 the terminal node determines whether the data transmitted by it has been received successfully based on the status and may also determine whether there is transmission collision on the contention based uplink transmission resource. If it is the third status, the terminal node may determine there is no collision and the data thereof has been successfully received. If it is the fourth status, the terminal node may determine there is no collision but the data thereof has not been successfully received. If it is the sixth status, the terminal node may determine there is collision and the data thereof has not been successfully received.

If it is the fifth status, the terminal node may determine there is collision and in step 1104-4 the terminal node receives information (referred to as the seventh information) including the identifier of the third terminal node whose data has been decoded successfully from the main control node. Then in step 1108-2 the terminal node determines whether the seventh information contains the identifier of the present terminal node, if yes, determines the data thereof has been successfully received, otherwise, determines the data thereof has not been successfully received.

With the above method, in the case of the third, fourth and sixth statuses, only 2 bits of physical layer feedback signaling are transmitted to let the terminal node know whether there is collision on the contention based uplink transmission resource as well as whether the data thereof has been received successfully. In this way, the processing amount is reduced significantly and the processing efficiency is improved.

Figure 12:
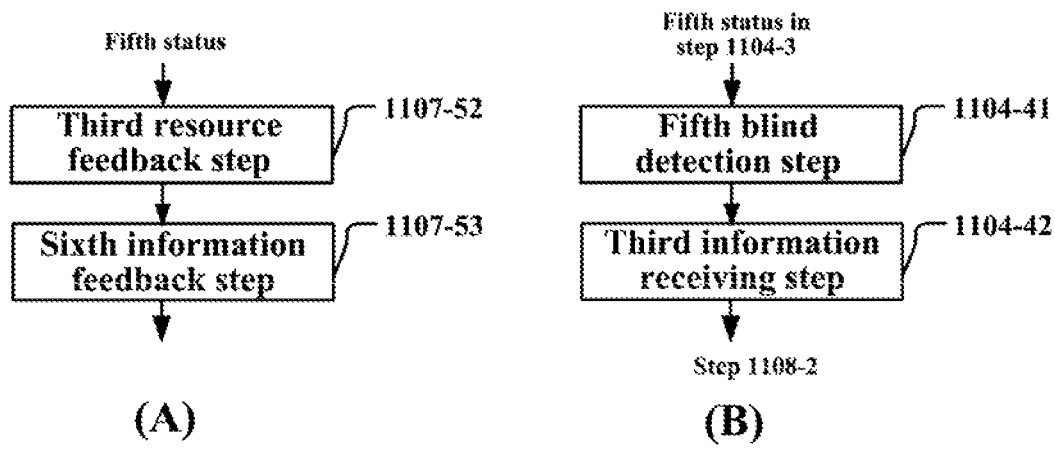
FIGS. 12(A) and (B) respectively illustrate particular examples of the status feedback step shown in FIG. 11(A) and the status receiving step shown in FIG. 11(B)

FIG. 12(A) shows an example of step 1107-5 for returning the identifier of the third terminal node in FIG. 11(A) and FIG. 12(B) shows an example corresponding to the step 1104-4 in FIG. 11(B).

In the example, the main control node firstly schedules a downlink transmission resource (referred to as the fifth downlink transmission resource), and then transmits the identifier of the third terminal node via the downlink transmission resource.

As shown in FIG. 11(A), steps 1107-5 may include steps 1107-52 and 1107-53.

In step 1107-52, the main control node firstly schedules the fifth downlink transmission resource for transmitting the identifier of the third terminal node, Particularly, the physical downlink control channel scrambled by the identifier of the contention based uplink transmission resource is used to transmit a schedule signaling (also called as the fifth schedule signaling) containing the information indicating the fifth downlink transmission resource. The step is also called as the third resource feedback step.

In step 1107-53, the identifier of the third terminal node is transmitted via the fifth downlink transmission resource. The step is also called as the sixth information feedback step.

The fifth downlink transmission resource may be any downlink transmission resource suitable for transmitting the receipt status information, such as the physical downlink shared channel (e.g. PDSCH in LTE standard) or any other downlink transmission resource, the description of which is omitted here.

As shown in FIG. 11(B), step 1104-4 of receiving information including the identifier of the third terminal node returned from the main control node includes steps 1104-41 and 1104-42.

In step 1104-41, the terminal node (also called as the fourth terminal node) uses the identifier of the contention based uplink transmission resource to perform a mask blind detection to the physical downlink control channel. This step is also called as the fifth blind detection step.

When detecting the fifth schedule signaling from the base station on the physical downlink control channel by using the identifier of the contention based uplink transmission resource, the terminal node parses the fifth schedule signaling to obtain the information of the fifth downlink transmission resource. Then in step 1104-42, the information including the identifier of the third terminal node is received via the fifth downlink transmission resource. This step is also called as the third information receiving step. This step is similar to that described above with reference to FIG. 4(B), the description of which is not repeated here.

In an example, an MAC layer feedback signaling may be used to transmit the identifier of the third terminal node. For example the method shown in FIG. 6(A) may be used. Particularly, step 1107-53 may include: encapsulating the information including the identifier of the third terminal node in an MAC signaling (referred to as the third MAC signaling), and transmitting the third MAC signaling via the fifth downlink transmission resource. The format, contents, transmission manner, and receipt manner of the MAC signaling are the same as described in the above embodiment. For example, the MAC signaling may include a backoff indicator (BI) and the like, the description of which is not repeated here.

In the example, the terminal node may receive the identifier by using the method shown in FIG. 6(B). Particularly, step 1104-42 may include: receiving the third MAC signaling via the fifth downlink transmission resource and parsing the third MAC signaling to obtain the information. In the example, if the third MAC signaling from the main control node further includes a BI, the terminal node may obtain the value of BI by parsing the information. Then the terminal node may execute the subsequent processing by using the above described method, the description of which is not repeated here.

Figure 13:
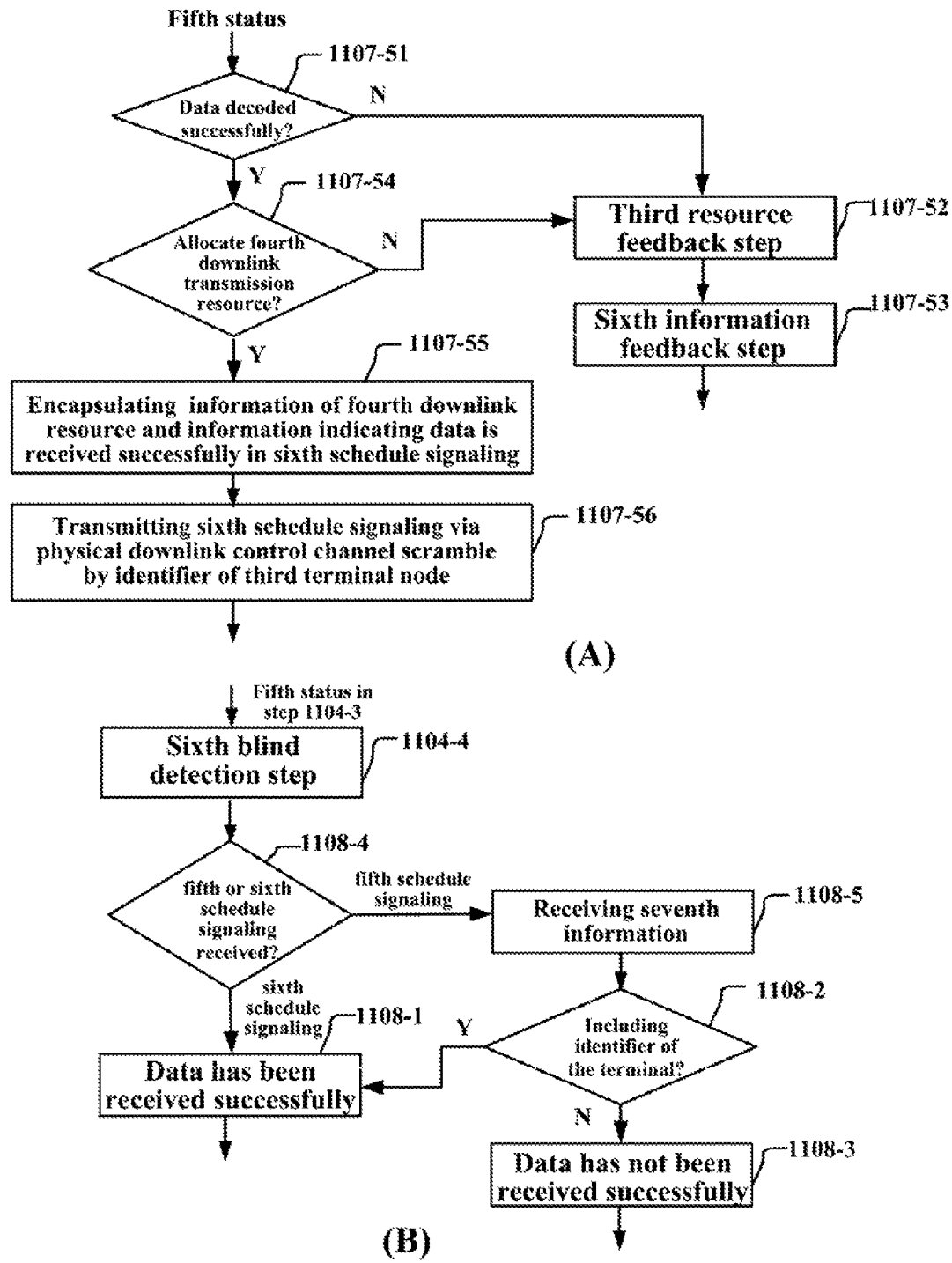
FIGS. 13(A) and (B) respectively illustrate other particular examples of the status feedback step shown in FIG. 11(A) and the status receiving step shown in FIG. 11(B)

FIG. 13(A) shows another example of step 1107-5 in FIG. 11(A), and FIG. 13(B) shows an example of corresponding receiving method.

As shown in FIG. 13(A), step 1107-5 may include steps 1107-51, 1107-52, 1107-53, 1107-54, 1107-55 and 1107-56.

In step 1107-51, the main control node determines whether the received data is decoded successfully, and if no, executes steps 1107-52 and 1107-53 (which are similar to those in FIG. 12(A), the description of which is not repeated here). If the data from a terminal node (the third terminal node) is decoded successfully, then in step 1107-54 the main control node determines whether to allocate new uplink transmission resource (referred to as the fourth uplink transmission resource) to the third terminal node.

The main control node may determine whether to allocate the uplink transmission resource by using any appropriate schedule algorithm. Optionally, the data from the terminal node may include information indicating its buffer status, such as the Buffer Status Report (BSR) defined in LTE. In this case, the main control node may decide whether to allocate the uplink transmission resource based on this information indicating the buffer status and the currently used schedule algorithm, the description of which is omitted here.

The fourth uplink transmission resource may be any appropriate uplink transmission resource, such as an uplink shared transmission channel (e.g. PUSCH in LTE standard), the description of which is omitted here.

If not to allocate the fourth uplink transmission resource to the third terminal node, the main control node executes steps 1107-52 and 1107-53, otherwise, it executes steps 1107-55 and 1107-56. In step 1107-55, the information indicating the fourth uplink transmission resource allocated to the third terminal node is encapsulated in a schedule signaling (referred to as the sixth schedule signaling). Then in step 1107-56, the sixth schedule signaling is transmitted via the physical downlink control channel scrambled with the identifier of the third terminal node.

As shown in FIG. 11(B), after determining that the sixth information indicates the fifth status in step 1104-3, the terminal node performs the blind detection in step 1104-4. In step 1104-4, the terminal node not only uses the identifier of the contention based uplink transmission resource to perform a mask blind detection to the physical downlink control channel, but also uses its own identifier to perform a mask blind detection to the physical downlink control channel. The step is also called as the sixth blind detection step.

In step 1108-4, the terminal node determines whether the sixth schedule signaling from the base station is received by using its own identifier, or determines whether the fifth schedule signaling is detected by using the identifier of the contention based uplink transmission resource.

If the sixth schedule signaling from the base station is received by using its own identifier, in step 1108-1 the terminal node may determine the data thereof has been received successfully. As an example, the schedule information indicating the first uplink transmission resource may be included in PDCCH DCI format 0 signaling defined in LTE standard. If the terminal node detects the PDCCH DCI format 0 by using its own identifier, it may determine the data thereof has been received successfully.

After receiving the sixth schedule signaling, the terminal node may parse the sixth schedule signaling to obtain the schedule information (i.e. information indicating the fourth uplink transmission resource) therein and continue to transmit data on the fourth uplink transmission resource. As described above, the fourth uplink transmission resource may be a resource on the physical uplink shared channel (e.g. PUSCH in LTE). For example, if the terminal node detects PDCCH DCI format 0 by using its identifier, it may transmit data on the uplink transmission resource (e.g. PUSCH resource) indicated by the schedule signaling contained in DCI format 0 in an appropriate uplink sub-frame (e.g. the (n+12)th sub-frame).

When the fifth schedule signaling containing information indicating the fifth downlink transmission resource is received by using the identifier of the contention based uplink transmission resource, the terminal node receives the seventh information including the identifier of the third terminal node from the main control node via the fifth downlink transmission resource in step 1108-5. For example, if PDCCH DCI is detected by using the identifier of the contention based uplink transmission resource, the seventh information is received via the downlink resource (the fifth downlink transmission resource) indicated by the schedule signaling in the DCI.

In step 1108-2 the terminal node determines whether its identifier is included in the seventh information; if yes, it may determine that the data thereof has been successfully received in step 1108-1; otherwise, it may determine that the data thereof has not been successfully received in step 1108-3.

As an example, if determining that the data thereof has been successfully received, the terminal node may choose to transmit new data via subsequently allocated contention based uplink transmission resource, or may choose to transmit a schedule request, requesting the base station to allocate a dedicated uplink transmission resource. If determining that the data thereof has not been successfully received, the terminal node may choose to retransmit the data via subsequently allocated contention based uplink transmission resource, or may choose to transmit a schedule request, requesting the base station to allocate a dedicated uplink transmission resource for data retransmission.

As an example, step 1107-53 may include: encapsulating the seventh information including the identifier of the third terminal node in the third MAC signaling, and transmitting the third MAC signaling via the fifth downlink transmission resource. Accordingly, step 1108-5 of receiving the seventh information may include: receiving the third MAC signaling via the fifth downlink transmission resource and parsing the third MAC signaling to obtain the seventh information. The format, contents, transmission manner, and receipt manner of the third MAC signaling are the same as described in the above embodiment. For example, the MAC signaling may include a backoff indicator (BI) and the like, the description of which is not repeated here. If the third MAC signaling from the main control node further includes a BI, the terminal node may obtain the value of BI by parsing the information, and then execute the following processing by using the above method, the description of which is not repeated here.

As an example, in the case of the third status, i.e. if the base station determines that there is data from only one user equipment on the contention based resource and the data from the user equipment is decoded successfully, the base station may further decide whether to allocate new uplink transmission resource to the terminal node based on the buffer status information from the terminal node (as an example, the data from the terminal node may include the buffer status information of the terminal node) and currently used schedule algorithm. If the base station decides to schedule the terminal node, the base station transmits a schedule signaling via the physical downlink control channel scrambled by the identifier of the terminal node, to allocate the uplink transmission resource to the terminal node. When the terminal node determines it is the third status, it may continue to perform a mask blind detection to the physical downlink control channel by using its identifier to receive the schedule signaling, so as to obtain the information of the newly allocated uplink transmission resource for transmitting new data.

As another example, in the case of the fourth status, i.e. if the base station determines that there is data from only one user equipment on the contention based resource and the data from the user equipment is not decoded successfully, the base station may further transmits a schedule signaling the base station via the physical downlink control channel scrambled by the identifier of the contention based uplink transmission resource, to allocate a contention based uplink transmission resource. For example, DCI format 0 may be transmitted via PDCCH, where if NDI is set as "1", it indicates the user equipment to retransmit the data. In the case of the fourth status, after the terminal node determines its data is not received successfully, it may perform a mask blind detection to the physical downlink control channel by using the identifier (e.g. CB-RNTI) of the contention based uplink transmission resource. If detecting NDI in DCI is 1, the terminal node stops the blind detection and retransmit data on the uplink resource (e.g. CB-grant on PUSCH) indicated by the schedule signaling in the DCI in a subsequent uplink sub-frame (e.g. the (n+12)th sub-frame). Since NDI is set as 1, other terminal nodes will not transmit data on this uplink resource.

As another example, in the case of the sixth status, i.e. if the base station determines that there are data from a plurality of user equipments on the contention based resource and no data is decoded successfully, the base station may transmit a schedule signaling via the physical downlink control channel scrambled with the identifier of the contention based uplink transmission resource (e.g. CB-RNTI) to schedule a downlink transmission resource and transmit an MAC feedback signaling on the downlink transmission resource. The MAC feedback signaling may contain no identifier of any terminal node, instead it may contain a BI. In the case of the fourth status, after the terminal node receives the physical layer feedback signaling and determines the data transmitted the contention based uplink transmission resource is not received successfully, it may perform a mask blind detection to the physical downlink control channel by using the identifier of the contention based uplink transmission resource. After detecting PDCCH DCI, the terminal node may receive data on the downlink resource indicated by the schedule signaling in DCI. If the received data contains the MAC feedback signaling containing a BI, the terminal node may generate a backoff value T within the scope [0,BI] randomly based on uniform distribution. After a delay of T units of time, the terminal node resume data transmission on the contention based uplink transmission resource. Optionally, during the backoff, the terminal node may choose to transmit a schedule request, requesting the base station to allocate a dedicated uplink transmission resource.

In the embodiments and examples as shown in FIGS. 3-6, the base station may has the capability of determining whether there is transmission collision among data from a plurality of user equipments on contention based uplink transmission resource, or may has no the capability. If the main control node has the capability, the communication system may choose to use the method shown in FIGS. 3-6, or the method shown in FIGS. 7-13. In this case, the base station and the terminal node may coordinate which information feedback method is used in advance.

Figure 15:
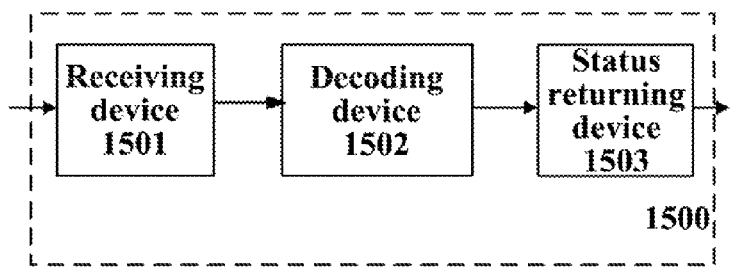
FIG. 15-19 are schematic block diagrams respectively showing the structures of the apparatus for feeding back data receipt status information configured in the main control node of the communication system according to the embodiments of the disclosure.

FIG. 15 shows a contention based uplink data transmission apparatus 1500 according to an embodiment. The apparatus 1500 may be provided in the main control node of the communication system. As shown in FIG. 15, the apparatus 1500 includes a receiving device 1501, a decoding device 1502 and a status returning device 1503.

The receiving device 1501 is used to receive the data transmitted via the contention based uplink transmission resource.

Similar to the above method embodiments or examples, the contention based uplink transmission resource refers to uplink transmission resource which is allocated by the main control node in the communication system to a plurality of terminal nodes and is to be used by the plurality of terminal nodes to transmit uplink data in a contention based manner, the description of which is not repeated here.

The decoding device 1502 is configured to decode the received data.

The status returning device 1503 is configured to return to the terminal nodes which transmit data via the uplink contention transmission resource, receipt status information which reflects whether the data transmitted by the terminal nodes has been successfully decoded.

The status returning device 1503 may feed back the receipt status information by using the status feedback step shown in FIGS. 3(A)-13(A), the description of which is not repeated here.

Figure 16:
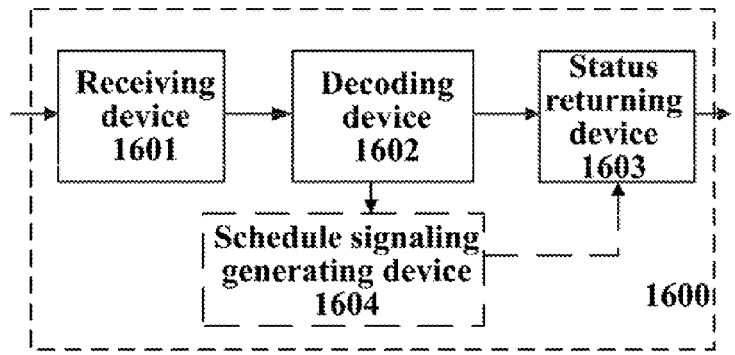

FIG. 16 shows a contention based uplink data transmission apparatus 1600 according to another embodiment. The apparatus 1600 may be provided in the main control node of the communication system. As shown in FIG. 16, the apparatus 1600 includes a receiving device 1601, a decoding device 1602 and a status returning device 1603, and further includes a schedule signaling generating device 1604.

The receiving device 1601 and the decoding device 1602 are similar to those devices 1501 and 1502 shown in FIG. 15, the description of which is not repeated here.

The schedule signaling generating device 1604 is configured to generate a schedule signaling to be transmitted via the physical downlink control channel. For example, the schedule signaling generating device 1604 may encapsulate the first information indicating a first downlink transmission resource in a first schedule signaling, and the status returning device 1603 may transmit the first schedule signaling via a physical downlink control channel scrambled by an identifier of the uplink contention transmission resource, and transmit second information including the receipt status information via the first downlink transmission resource, and the receipt status information includes an identifier of a first terminal node which has transmitted data successfully decoded by the main control node.

The schedule signaling generating device 1604 may generate the schedule signaling and the status returning device 1603 may transmit the schedule signaling, by using the above described method, the description of which is not repeated here.

Figure 17:
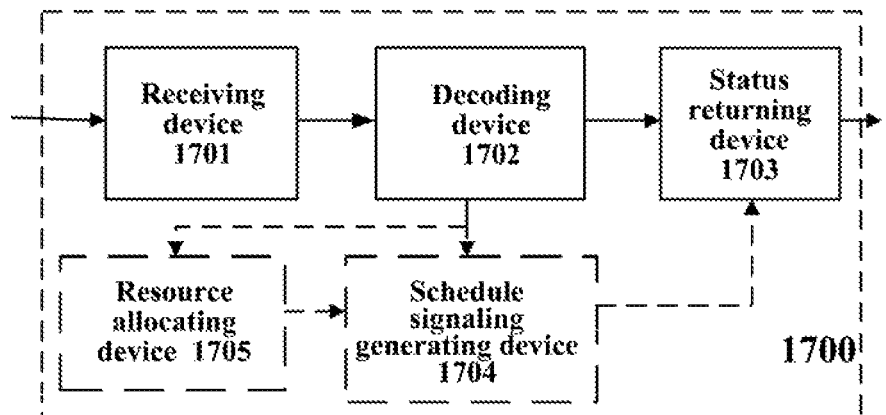

FIG. 17 shows a contention based uplink data transmission apparatus 1700 according to another embodiment. The apparatus 1700 is also provided in the main control node of the communication system. The apparatus 1700 is similar to the apparatus 1600, the difference lies in that the apparatus 1700 further includes a resource allocating device 1705.

The receiving device 1701 and the decoding device 1702 are similar to those described in the above embodiments, the description of which is not repeated here.

The resource allocating device 1705 may determine whether to allocate the uplink transmission resource to the terminal node. For example, the resource allocating device 1705 may determine whether to allocate to the first terminal node a first uplink transmission resource after successfully decoded the data transmitted by the first terminal node. If yes, the resource allocating device 1705 indicates the schedule signaling generating device 1704 to generate the schedule signaling. The resource allocating device 1705 may determine whether to allocate the uplink transmission resource to the terminal node by using the above described method, the description of which is not repeated here.

The schedule signaling generating device 1704 is similar to the device 1604, In addition, the schedule signaling generating device 1704 may be further configured to encapsulate, if it is determined to allocate to the first terminal node the first uplink transmission resource, information of the first uplink transmission resource and the information indicating whether the data has been received successfully in a second schedule signaling.

The status returning device 1703 transmits the first schedule signaling via the physical downlink control channel scrambled by the identifier of the contention based uplink transmission resource and transmits the receipt status information via the first downlink transmission resource. In addition, the status returning device 1703 may be further configured to transmit the second schedule signaling via the physical downlink control channel scrambled by the identifier of the first terminal node.

The schedule signaling generating device 1704 may generate the schedule signaling and the status returning device 1703 may transmit the schedule signaling, by using the above mentioned methods, the description of which is not repeated here.

Figure 18:
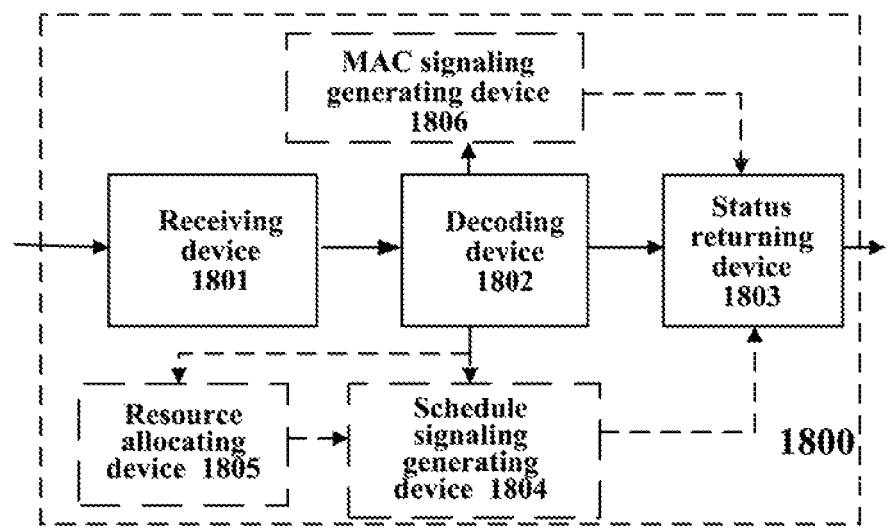

FIG. 18 shows a contention based uplink data transmission apparatus 1800 according to another embodiment. The apparatus 1800 is also provided in the main control node of the communication system. The apparatus 1800 is similar to the apparatus 1700, the difference lies in that the apparatus 1800 further includes an MAC signaling generating device 1806.

The devices 1801, 1802, 1803, 1804 and 1805 in the apparatus 1800 are similar to those in the apparatus 1700, the description of which is not repeated here.

In addition, the MAC signaling generating device 1806 is configured to generate an MAC layer feedback signaling. For example, the MAC signaling generating device 1806 may encapsulate the second information in the first MAC signaling, and the status returning device 1803 may transmit the first MAC signaling via the first downlink transmission resource.

The MAC signaling generating device 1806 may generate and transmit the MAC signaling by using the above methods, the description of which is not repeated here.

Figure 19:
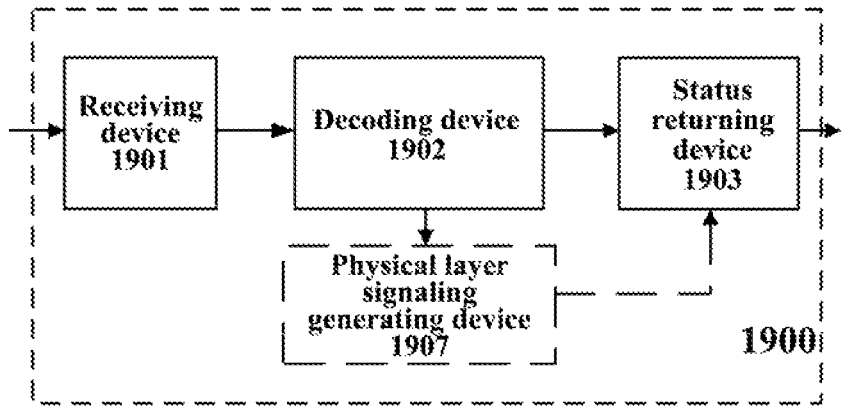

FIG. 19 shows a contention based uplink data transmission apparatus 1900 according to another embodiment. The apparatus 1900 is also provided in the main control node of the communication system. The apparatus 1900 is similar to the apparatus 1500, the difference lies in that the decoding device 1902 in the apparatus 1900 may be further configured to determine whether a uplink transmission collision occurs on the uplink contention transmission resource. In this case, the status returning device 1903 may be further configured to return information indicating whether the uplink transmission collision occurs to the terminal nodes transmitting data via the uplink contention transmission resource.

The devices in the apparatus 1900 may have the functions similar to those methods described with reference to FIGS. 7(A)-13(A), the description of which is not repeated here.

As an example, the apparatus 1900 may further include a physical layer signaling generating device 1907. The physical layer signaling generating device 1907 is configured to generate a physical layer feedback signaling. For example, the physical layer signaling generating device 1907 may encapsulate the third information indicating one of the first status and the second status in the first physical layer feedback signaling by using the above method described above. The status returning device 1903 may transmit the first physical layer feedback signaling to the terminal nodes via the second downlink transmission resource, and in the case of the second status, returns the identifier of the second terminal node the data from which has been decoded successfully to the terminal nodes. The physical layer signaling generating device 1907 may generate the physical layer feedback signaling with the above method, the description of which is not repeated here.

Figure 20:
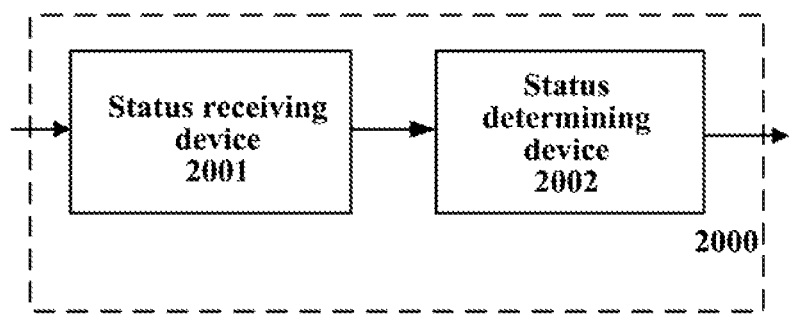
FIG. 20-22 are schematic block diagrams respectively showing the structures of the apparatus for receiving data receipt status information configured in the terminal node of the communication system according to the embodiments of the disclosure.

FIG. 20 shows a contention based uplink data transmission apparatus 2000 according to an embodiment. The apparatus 2000 is provided in the terminal node of the communication system. As shown in FIG. 20, the apparatus 2000 includes a status receiving device 2001 and a status determining device 2002.

The status receiving device 2000 is configured to receive, after the current terminal node transmits data via a uplink contention transmission resource to a main control node in the communication system, receipt status information which is returned from the main control node and reflects whether data transmitted by terminal nodes, transmitting data in a contention-based manner to the main control node via the uplink contention transmission resource, has been successfully decoded, wherein the uplink contention transmission resource is a uplink transmission resource which is allocated by the main control node to a plurality of terminal nodes in the communication system and used for uplink transmission by the plurality of terminal nodes in a contention-based manner.

The status determining device 2002 is configured to determine whether the data transmitted by the current terminal node has been successfully decoded according to the receipt status information.

The status receiving device 2000 may receive the receipt status information by using the methods described with reference to FIGS. 3(B)-13(B), the status determining device 2002 may determine the receipt status of data by using the methods described with reference to FIGS. 3(B)-13(B), the description of which is not repeated here.

Figure 21:
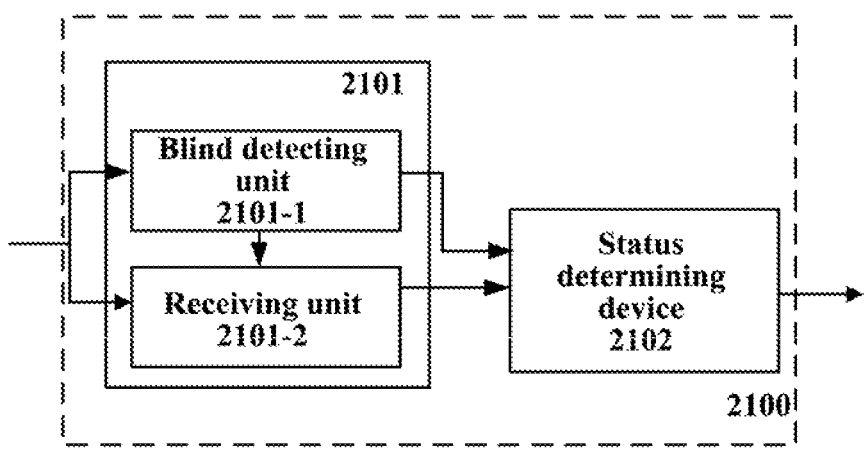

FIG. 21 a contention based uplink data transmission apparatus 2100 according to another embodiment. The apparatus 2100 is also provided in the terminal node of the communication system. As shown in FIG. 21, the status receiving device 2101 in the apparatus 2100 may include a blind detecting unit 2101-1 and a receiving unit 2101-2.

The blind detecting unit 2101-1 may perform a mask blind detection to the physical downlink control channel, to receive the schedule signaling transmitted via the channel. For example, the blind detecting unit 2101-1 may blind decode the physical downlink control channel using an identifier of the uplink contention transmission resource, to receive a first schedule signaling encapsulated with the first information indicating the first downlink transmission resource.

The receiving unit 2101-2 may receive information returned from the main control node via the physical downlink channel. For example, when the blind detecting unit 2101-1 receives the first schedule signaling, it may indicate the receiving unit 2101-2 to receive the second information including the receipt status information returned by the main control node via the first downlink transmission resource. The status determining device 2102 is configured to determine whether the second information includes an identifier of the current terminal node, and if yes, determine the data transmitted by the current terminal node has been successfully decoded.

As an example, the blind detecting unit 2101-1 may use both the identifier of the terminal node and the identifier of the contention based uplink transmission resource to perform a mask blind detection to the physical downlink control channel. If receiving the second schedule signaling by using the identifier of the terminal node, the status determining device 2102 determines that the data transmitted by the current terminal node is received successfully. When receiving the first schedule signaling containing the first information indicating the first downlink transmission resource by using the identifier of the contention based uplink transmission resource, the blind detecting unit 2101-1 indicates the receiving unit 2101-2 to receive the second information containing the receipt status information transmitted via the first downlink transmission resource from the main control node, and the status determining device 2102 may determine whether the identifier of the first terminal node is the identifier of the current terminal node, and if yes, determine that the data transmitted by the current terminal node is received successfully.

Figure 22:
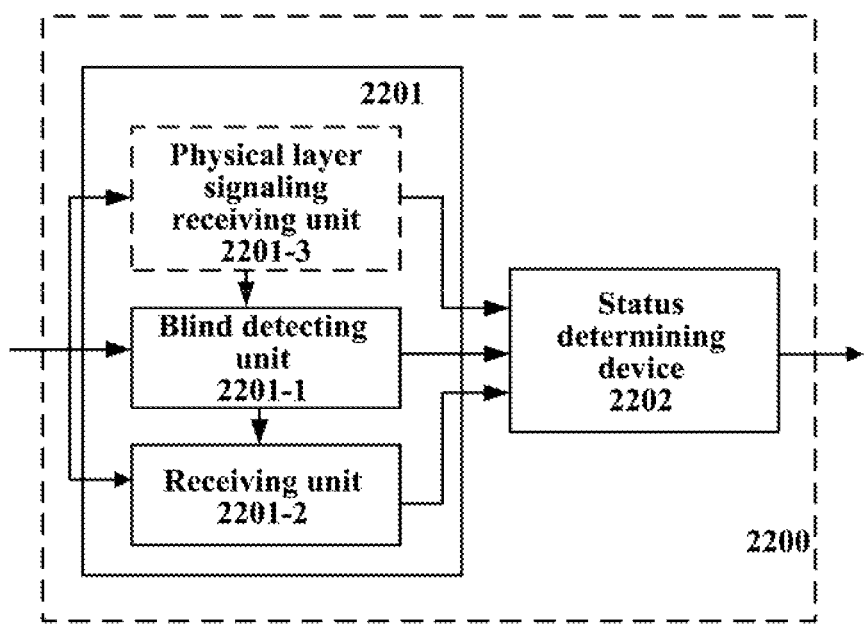

FIG. 22 a contention based uplink data transmission apparatus 2200 according to another. The apparatus 2200 is also provided in the terminal node of the communication system. The apparatus 2200 is similar to the apparatus 2100, the difference lies in that the status receiving device 2201 further includes a physical layer signaling receiving unit 2201-3, in addition to a blind detecting unit 2201-1 and a receiving unit 2201-2.

The physical layer signaling receiving unit 2201-3 may receives the physical layer feedback signaling returned from the main control node. For example, the physical layer signaling receiving unit 2201-3 may receive the information indicating whether there is an uplink transmission collision returned by the main control node by using a physical layer feedback signaling, via for example a physical downlink hybrid ARQ channel.

The physical layer signaling receiving unit 2201-3 may receives the physical layer feedback signaling by using the above method, the description of which is not repeated here.

With the above apparatus, the base station may return the receipt status information of the data to each terminal node that has transmitted data via the contention based uplink transmission resource. And each terminal node may know in time whether the data transmitted by it has been received successfully.

It should be understood that the above embodiments and examples are illustrative, rather than exhaustive. The present disclosure should not be regarded as being limited to any particular embodiments or examples stated above.

In the above embodiments and examples, the expressions, such as "the first", "the second", and "the Nth", are used. Those skilled in the art will appreciate that such expressions are used merely to differentiate the terms in literal, and should not be considered as defining the sequence or the like of the terms.

As an example, the components, units or steps in the above apparatuses and methods can be configured with software, hardware, firmware or any combination thereof in the main node (e.g. the base station, eNodeB) or terminal node (e.g. user equipment) of the communication network, as part of the base station or terminal node. The components, units or steps in the above apparatuses and methods can be configured with software, hardware, firmware or any combination thereof by using any appropriate means or manners known in the art, the description of which is not detailed herein.

It should be noted, communication systems including the above apparatus also fall within the protection scope of disclosure.

Figure 23:
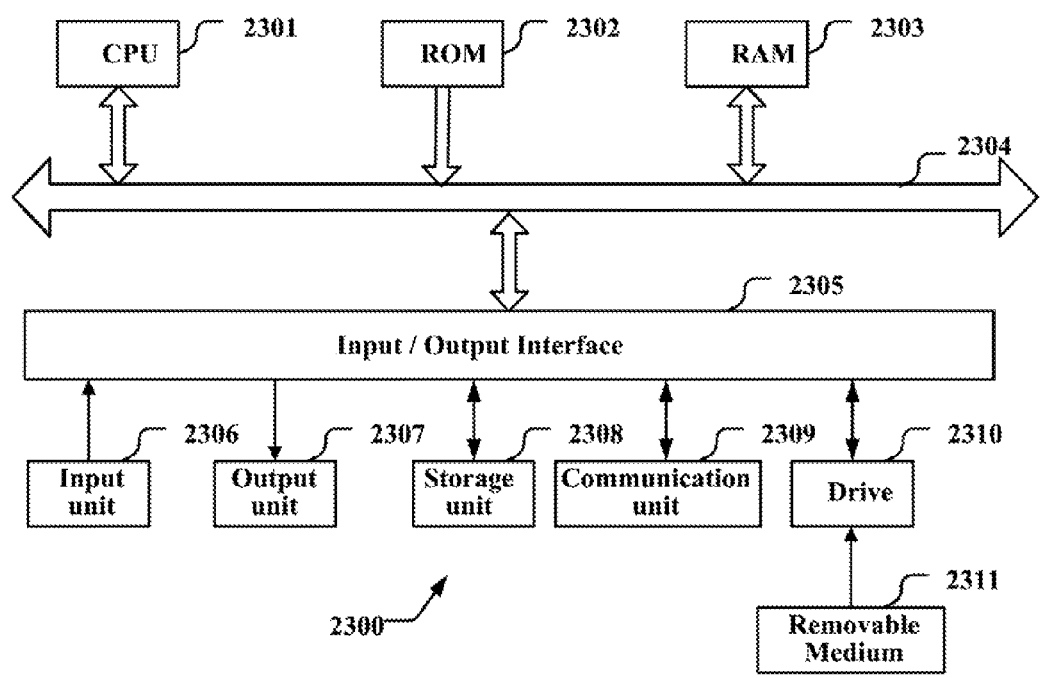
FIG. 23 is a schematic block diagram showing the structure of a computer which may be used for realizing the embodiments or examples of the disclosure.

As an example, in the case of using software or firmware, programs constituting the software for realizing the above method or apparatus can be installed to a computer with a specialized hardware structure (e.g. the general purposed computer 2300 as shown in FIG. 23) from a storage medium or a network. The computer, when installed with various programs, is capable of carrying out various functions.

In FIG. 23, a central processing unit (CPU) 2301 executes various types of processing in accordance with programs stored in a read-only memory (ROM) 2302, or programs loaded from a storage unit 2308 into a random access memory (RAM) 2303. The RAM 2303 also stores the data required for the CPU 2301 to execute various types of processing, as required. The CPU 2301, the ROM 2302, and the RAM 2303 are connected to one another through a bus 2304. The bus 2304 is also connected to an input/output interface 2305.

The input/output interface 2305 is connected to an input unit 2306 composed of a keyboard, a mouse, etc., an output unit 2307 composed of a cathode ray tube or a liquid crystal display, a speaker, etc., the storage unit 2308, which includes a hard disk, and a communication unit 2309 composed of a modem, a terminal adapter, etc. The communication unit 2309 performs communicating processing. A drive 2310 is connected to the input/output interface 2305, if needed. In the drive 2310, for example, removable media 2311 is loaded as a recording medium containing a program of the present invention. The program is read from the removable media 2311 and is installed into the storage unit 2308, as required.

In the case of using software to realize the above consecutive processing, the programs constituting the software may be installed from a network such as Internet or a storage medium such as the removable media 2311.

Those skilled in the art should understand the storage medium is not limited to the removable media 2311, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 2302 or the hard disc involved in the storage unit 2308, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

The invention claimed is:

1. A method for contention-based uplink transmission in a communication system, comprising:

receiving, by a main control node in the communication system, data transmitted via a uplink contention transmission resource, and decoding the received data, wherein the uplink contention transmission resource is a uplink transmission resource which is allocated by the main control node to a plurality of terminal nodes in the communication system and used for uplink transmission by the plurality of terminal nodes in a contention-based manner;

returning, by the main control node to terminal nodes transmitting data via the uplink contention transmission resource, receipt status information which reflects whether the data transmitted by the terminal nodes has been successfully decoded, wherein returning to the terminal nodes the receipt status information comprises:

determining whether to allocate to the first terminal node a first uplink transmission resource after successfully decoding the data transmitted by the first terminal node;

if determining to allocate to the first terminal node the first uplink transmission resource, encapsulating information of the first uplink transmission resource in a second schedule signaling, and transmitting the second schedule signaling via the physical downlink control channel scrambled by the identifier of the first terminal node; and if determining not to allocate the first uplink transmission resource, transmitting a first schedule signaling encapsulated with first information indicating a first downlink transmission resource via a physical downlink control channel scrambled by an identifier of the uplink contention transmission resource, and transmitting second information comprising the receipt status information via the first downlink transmission resource.

2. The method according to claim 1, wherein the receipt status information comprises identifier of a first terminal node which has transmitted data successfully decoded by the main control node, and returning to the terminal nodes the receipt status information comprises:

transmitting a first schedule signaling encapsulated with first information indicating a first downlink transmission resource via a physical downlink control channel scrambled by an identifier of the uplink contention transmission resource; and transmitting second information comprising the receipt status information via the first downlink transmission resource.

3. The method according to claim 2, wherein transmitting the second information via the first downlink transmission resource comprises:

encapsulating the second information in a first media access control signaling; and transmitting the first media access control signaling via the first downlink transmission resource.

4. A method for contention-based uplink transmission in a communication system, comprising:

receiving, by a main control node in the communication system, data transmitted via a uplink contention transmission resource, and decoding the received data, wherein the uplink contention transmission resource is a uplink transmission resource which is allocated by the main control node to a plurality of terminal nodes in the communication system and used for uplink transmission by the plurality of terminal nodes in a contention-based manner;

returning, by the main control node to terminal nodes transmitting data via the uplink contention transmission resource, receipt status information which reflects whether the data transmitted by the terminal nodes has been successfully decoded;

determining by the main control node whether an uplink transmission collision occurs on the uplink contention transmission resource, wherein returning to the terminal nodes the receipt status information further comprises:

returning information indicating whether the uplink transmission collision occurs to the terminal nodes transmitting data via the uplink contention transmission resource;

encapsulating sixth information indicating one of a third status, a fourth status, a fifth status and a six status in a second physical layer feedback signaling, wherein the third status is a status in which no uplink transmission collision occurs and the received data is successfully decoded, the fourth status is a status in which no uplink transmission collision occurs and the received data is not successfully decoded, the fifth status is a status in which a uplink transmission collision occurs and data transmitted from a third terminal node is successfully decoded, and the sixth status is a status in which a uplink transmission collision occurs and the received data is not successfully decoded;

transmitting the second physical layer feedback signaling to the terminal nodes via a fourth downlink transmission resource; and transmitting, in the fifth status, an identifier of the third terminal node to the terminal nodes.

5. The method according to claim 4, wherein transmitting the identifier of the third terminal node to the terminal nodes comprises:

transmitting a fifth schedule signaling encapsulated with information indicating a fifth downlink transmission resource via a physical downlink control channel scrambled by an identifier of the uplink contention transmission resource; and transmitting information including the identifier of the third terminal node via the fifth downlink transmission resource.

6. The method according to claim 5, wherein transmitting the identifier of the third terminal node to the terminal nodes comprises:

determining whether to allocate to the third terminal node a fourth uplink transmission resource;

if determining to allocate the fourth uplink transmission resource in the fifth status, encapsulating information of the fourth uplink transmission resource in a sixth schedule signaling; and transmitting the sixth schedule signaling via the physical downlink control channel scrambled by the identifier of the third terminal node; and otherwise, transmitting a fifth schedule signaling encapsulated with information indicating a fifth downlink transmission resource via a physical downlink control channel scrambled by an identifier of the uplink contention transmission resource; and transmitting information including the identifier of the third terminal node via the fifth downlink transmission resource.

7. An apparatus for contention-based uplink transmission, configured in a main control node in a communication system, and comprising:

a receiving device, configured to receive data transmitted via a uplink contention transmission resource, wherein the uplink contention transmission resource is a uplink transmission resource which is allocated by the main control node to a plurality of terminal nodes in the communication system and used for uplink transmission by the plurality of terminal nodes in a contention-based manner;

a decoding device, configured to decode the received data;

a status returning device, configured to return to terminal nodes transmitting data via the uplink contention transmission resource, receipt status information which reflects whether the data transmitted by the terminal nodes has been successfully decoded; and a resource allocating device, configured to determine whether to allocate to the first terminal node a first uplink transmission resource after successfully decoded the data transmitted by the first terminal node, wherein, the schedule signaling generating device is further configured to encapsulate, if it is determined to allocate to the first terminal node the first uplink transmission resource, information of the first uplink transmission resource in a second schedule signaling, and wherein the status returning device is further configured to transmit the second schedule signaling via the physical downlink control channel scrambled by the identifier of the first terminal node.

8. The apparatus according to claim 7, further comprising a schedule signaling generating device configured to encapsulate first information indicating a first downlink transmission resource in a first schedule signaling, and wherein the status returning device is configured to transmit the first schedule signaling via a physical downlink control channel scrambled by an identifier of the uplink contention transmission resource, and transmit second information including the receipt status information via the first downlink transmission resource, and the receipt status information comprises an identifier of a first terminal node which has transmitted data successfully decoded by the main control node.

9. A terminal node in a communication system, comprising:

a status receiving device, configured to receive, after the current terminal node transmits data via a uplink contention transmission resource to a main control node in the communication system, receipt status information which is returned from the main control node and reflects whether data transmitted by terminal nodes, transmitting data in a contention-based manner to the main control node via the uplink contention transmission resource, has been successfully decoded, wherein the uplink contention transmission resource is a uplink transmission resource which is allocated by the main control node to a plurality of terminal nodes in the communication system and used for uplink transmission by the plurality of terminal nodes in a contention-based manner; and a status determining device, configured to determine whether the data transmitted by the current terminal node has been successfully decoded according to the receipt status information, wherein the status receiving device comprises:

a blind detecting unit, configured to blind decode a physical downlink control channel using an identifier of the uplink contention transmission resource, to receive a first schedule signaling encapsulated with first information indicating a first downlink transmission resource; and a receiving unit, configured to receive, when the first schedule signaling is received by the blind decoding unit, second information including the receipt status information returned by the main control node via the first downlink transmission resource, the receipt status information comprises identifier of a first terminal node which has transmitted data successfully decoded by the main control node, and wherein the status determining device is configured to determine whether the second information comprises an identifier of the current terminal node, and if yes, determine the data transmitted by the current terminal node has been successfully decoded.

10. The terminal node according to claim 9, wherein the status receiving device comprises:

a blind detecting unit, configured to blind decode a physical downlink control channel using both an identifier of the uplink contention transmission resource and an identifier of the fourth terminal node; and a receiving unit, configured to receive, when a first schedule signaling encapsulated with first information indicating a first downlink transmission resource is received by the blind detecting unit using the identifier of the uplink contention transmission resource, second information including the receipt status information returned by the main control node via the first downlink transmission resource, and wherein the status determining device is configured to: determine the data transmitted by the current terminal node has been successfully decoded when the blind detecting unit detects a second schedule signaling using the identifier of the current terminal node, and when the second information is received, determine whether the second information comprises the identifier of the current terminal node, and if yes, determine the data transmitted by the fourth terminal node has been successfully decoded.

* * * * *